(12) United States Patent
Melkote Krishnaprasad et al.

(10) Patent No.: US 10,779,011 B2
(45) Date of Patent: Sep. 15, 2020

(54) ERROR CONCEALMENT IN VIRTUAL REALITY SYSTEM

(71) Applicant: QUALCOMM Incorporated, San Diego, CA (US)

(72) Inventors: Vinay Melkote Krishnaprasad, Bangalore (IN); Pawan Kumar Baheti, Bangalore (IN); Ajit Venkat Rao, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 15/664,898

(22) Filed: Jul. 31, 2017

(65) Prior Publication Data

US 2019/0037244 A1 Jan. 31, 2019

(51) Int. Cl.
*H04N 19/895* (2014.01)
*G06K 9/46* (2006.01)
*H04N 19/105* (2014.01)
*H04N 19/107* (2014.01)
*H04N 19/167* (2014.01)
*H04N 19/164* (2014.01)
*H04N 19/172* (2014.01)
*H04N 19/162* (2014.01)
*H04N 19/00* (2014.01)

(52) U.S. Cl.
CPC ............ *H04N 19/895* (2014.11); *G06K 9/46* (2013.01); *H04N 19/105* (2014.11); *H04N 19/107* (2014.11); *H04N 19/162* (2014.11); *H04N 19/164* (2014.11); *H04N 19/167* (2014.11); *H04N 19/172* (2014.11); *H04N 19/00* (2013.01)

(58) Field of Classification Search
None
See application file for complete search history.

(56) References Cited

U.S. PATENT DOCUMENTS 6,157,396 A 12/2000 Margulis et al.
9,558,557 B2 1/2017 Jiang et al.
(Continued)

FOREIGN PATENT DOCUMENTS

CN 106658170 A * 5/2017

OTHER PUBLICATIONS

Didyk, et al. "Adaptive Image-space Stereo View Synthesis," Vision, Modeling, and Visualization (2010), The Europgraphics Association, 8 pp. (Applicant points out, in accordance with MPEP 609.04(a), that the year of publication, 2010, is sufficiently earlier than the effective U.S. filing date, 2017, so that the particular month of publication is not in issue.).

(Continued)

*Primary Examiner* — Lindsay J Uhl
(74) *Attorney, Agent, or Firm* — Shumaker & Sieffert, P.A.

(57) ABSTRACT

Example techniques are described for image processing. Processing circuitry may warp image content of a previous frame based on pose information of a device when the device requested image content information of the previous frame and pose information of the device when the device requested image content information of a current frame to generate warped image content, and blend image content from the warped image content with image content of the current frame to generate an error concealed frame. A display screen may display image content based on the error concealed frame.

24 Claims, 8 Drawing Sheets

(56) References Cited

U.S. PATENT DOCUMENTS

| | | | |
|---|---|---|---|
| 2004/0104935 A1 | 6/2004 | Williamson et al. | |
| 2009/0148058 A1* | 6/2009 | Dane | H04N 5/145 |
| | | | 382/251 |
| 2014/0211860 A1* | 7/2014 | Zhao | H04N 19/172 |
| | | | 375/240.27 |
| 2014/0337634 A1 | 11/2014 | Starner et al. | |
| 2015/0124816 A1* | 5/2015 | Park | H04L 1/1809 |
| | | | 370/392 |
| 2016/0073117 A1 | 3/2016 | Grasmug et al. | |
| 2016/0227257 A1* | 8/2016 | Frishman | H04N 21/44209 |
| 2017/0018121 A1* | 1/2017 | Lawson | G06T 3/0093 |
| 2018/0081429 A1* | 3/2018 | Akenine-Moller | G06F 3/14 |

OTHER PUBLICATIONS

Mark, et al., "Post-Rendering 3D Warping," In Proceedings of 1997 Symposium on Interactive 3D Graphics, Apr. 27-30, 1997, pp. 7-16.

Lochmann, et al., "Real-time Reflective and Refractive Novel-view Synthesis," Vision, Modeling, and Visualization (2014), The Europgraphics Association, 8 pp. (Applicant points out, in accordance with MPEP 609.04(a), that the year of publication, 2014, is sufficiently earlier than the effective U.S. filing 2017, so that the particular month of publication is not in issue.).

Didyk, et al., "Preceptually-motivated Real-time Temporal Upsampling of 3D Content for High-refresh-rate Displays," Eurographics 2010, vol. 20, No. 2, 10 pp. (Applicant points out, in accordance with MPEP 609.04(a), that the year of publication, 2010, is sufficiently earlier than the effective U.S. filing date, 2017, so that the particular month of publication is not in issue.).

\* cited by examiner

ERROR CONCEALMENT IN VIRTUAL REALITY SYSTEM

TECHNICAL FIELD

The disclosure relates to processing of image content information and, more particularly, post-processing of image content information for output to a display.

BACKGROUND

Split-rendered systems may include at least one host device and at least one client device that communicate over a network (e.g., a wireless network, wired network, etc.). For example, a Wi-Fi Direct (WFD) system includes multiple devices communicating over a Wi-Fi network. The host device acts as a wireless access point and sends image content information, which may include audio video (AV) data, audio data, and/or video data, to one or more client devices participating in a particular peer-to-peer (P2P) group communication session using one or more wireless communication standards, e.g., IEEE 802.11. The image content information may be played back at the client devices. More specifically, each of the participating client devices processes the received image content information for presentation on its display screen and audio equipment. In addition, the host device may perform at least some processing of the image content information for presentation on the client devices.

The host device and one or more of the client devices may be either wireless devices or wired devices with wireless communication capabilities. In one example, as wired devices, one or more of the host device and the client devices may comprise televisions, monitors, projectors, set-top boxes, DVD or Blu-Ray Disc players, digital video recorders, laptop or desktop personal computers, video game consoles, and the like, that include wireless communication capabilities. In another example, as wireless devices, one or more of the host device and the client devices may comprise mobile telephones, portable computers with wireless communication cards, personal digital assistants (PDAs), portable media players, or other flash memory devices with wireless communication capabilities, including so-called "smart" phones and "smart" pads or tablets, or other types of wireless communication devices (WCDs).

In some examples, at least one of the client devices may comprise a wearable display device. A wearable display device may comprise any type of wired or wireless display device that is worn on a user's body. As an example, the wearable display device may comprise a wireless head-worn display or wireless head-mounted display (WHMD) that is worn on a user's head in order to position one or more display screens in front of the user's eyes. The host device is typically responsible for performing at least some processing of the image content information for display on the wearable display device. The wearable display device is typically responsible for preparing the image content information for display at the wearable display device.

SUMMARY

In general, this disclosure relates to techniques for concealing errors in a virtual reality system. At times, image content information transmitted by a host device may be dropped or error-filled so that all of the image content of a current frame cannot be reconstructed at the client device. To fill in image content, of the current frame, that was not reconstructed, this disclosure describes warping image content of a previous frame based on pose information of a previous frame and pose information of the current frame to generate a warped frame. Processing circuitry may utilize this warped frame for purposes of filling in missing image content in the current frame. In this way, the processing circuitry performs error concealment with a previous frame that is warped based on pose information resulting in a better estimate of the missing image content as compared to techniques that do not rely on pose information.

In one example, this disclosure describes a method of image processing, the method comprising warping image content of a previous frame based on pose information of a device when the device requested image content information of the previous frame and pose information of the device when the device requested image content information of a current frame to generate warped image content, blending image content from the warped image content with image content of the current frame to generate an error concealed frame, and displaying image content based on the error concealed frame.

In one example, this disclosure describes a device for image processing, the device comprising processing circuitry configured to warp image content of a previous frame based on pose information of a device when the device requested image content information of the previous frame and pose information of the device when the device requested image content information of a current frame to generate warped image content, and blend image content from the warped image content with image content of the current frame to generate an error concealed frame, and a display screen configured to display image content based on the error concealed frame.

In one example, this disclosure describes a computer-readable storage medium storing instructions thereon that when executed cause one or more processors to warp image content of a previous frame based on pose information of a device when the device requested image content information of the previous frame and pose information of the device when the device requested image content information of a current frame to generate warped image content, blend image content from the warped image content with image content of the current frame to generate an error concealed frame, and display image content based on the error concealed frame.

In one example, this disclosure describes a device for image processing, the device comprising means for warping image content of a previous frame based on pose information of a device when the device requested image content information of the previous frame and pose information of the device when the device requested image content information of a current frame to generate warped image content, means for blending image content from the warped image content with image content of the current frame to generate an error concealed frame, and means for displaying image content based on the error concealed frame.

The details of one or more examples of the disclosure are set forth in the accompanying drawings and the description below. Other features, objects, and advantages will be apparent from the description, drawings, and claims.

DETAILED DESCRIPTION

Figure 1:
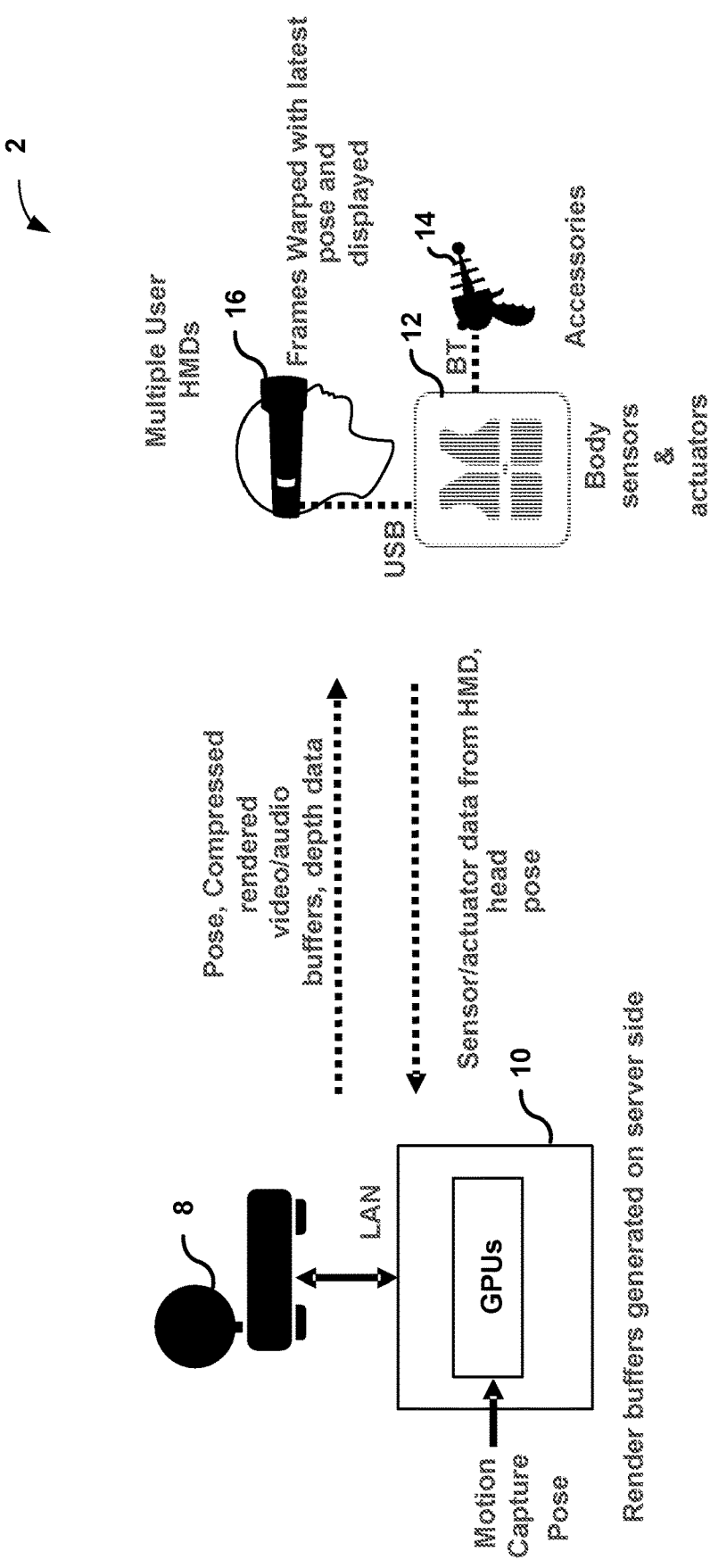
FIG. 1 is a block diagram illustrating a split-rendered system including a host device and a wearable display device.

Imaging systems may generate a 360-degree image (e.g., canvas) for displaying video. For example, an imaging system may output a portion of the canvas that is in a user's field of view at a virtual reality (VR) headset.

Some imaging systems may be split-rendered. An example split-rendered system may include a host device (e.g., computer, cloud, etc.) that generates a compressed rendered video buffer (and a compressed rendered audio buffer) and a client device (e.g., a head-mounted display (HMD)) that decompresses the compressed rendered video buffer (and audio buffer) for display at the client device.

In virtual reality applications, a user wears the HMD device that includes processing circuitry to receive, decode, process, and display image content. The image content that the HMD device receives is based on the pose information (e.g., pitch, roll, and yaw) of the HMD device. For instance, the HMD device sends pose information to a server (e.g., host device) relatively frequently, and in some cases, continuously. The server, based on the pose information, encodes and transmits image content that would be viewable from the particular pose of the HMD device.

Circuitry on the HMD (e.g., a video decoder) receives the image content and reconstructs the image content to generate a frame. The circuitry may repeat such operations to generate a plurality of frames, which form the video that is displayed. However, in some cases, image content information may be lost in transmission or there may be too many errors for proper reconstruction of portions of a frame. The term "lost" is used generically to refer to the case where the image content information is not received and the case where the image content is received but is too corrupted for image reconstruction. The phrase "missing image content" is used similarly as well to refer to the image content that is missing in transmission or corrupted.

In video processing, error concealment is a way in which circuitry (e.g., a video decoder) conceals image portions whose content was lost in transmission or was otherwise not decodable (e.g., because too many errors). As one example, the video decoder replaces the missing portions with image content from a previous frame, or uses motion vectors of neighboring blocks to determine image content for the missing portions.

While the video decoder of the HMD device may provide some measure of error concealment, the error concealment algorithm of the video decoder may not account for pose information in performing error concealment. This disclosure describes example error concealment techniques that utilize pose information in determining the image content used to replace missing image content (e.g., missing portions of an image due to loss of data or other errors).

The example techniques may be performed by the video decoder, but may be performed by other devices in addition to or instead of the video decoder such as a central processing unit (CPU) and/or graphics processing unit (GPU). Also, in some examples, the video decoder may not necessarily provide any error concealment, and the techniques may be applicable to examples where the video decoder does not provide error concealment.

In general, processing circuitry (e.g., video decoder, CPU, GPU, or any combination) applies the error concealment techniques that utilize pose information on a decoded image. This decoded image may be generated with some amount of error concealment, but the techniques do not require such error concealment.

When sending image content, the server includes header information identifying the pose information associated with the sent image content. A bitstream parser of the processing circuitry, on the HMD, may parse the received bitstream to determine the pose information for each frame, and may also determine for which image content the image content information is missing (e.g., determine information indicating locations of the missing portions).

From the information indicating locations of the missing portions, the processing circuitry may form a mask. For example, the image may be divided into a plurality of portions (e.g., blocks), and for each portion for which there is available image content, the processing circuitry may store a digital high, and for each portion for which there is no available image content, the processing circuitry may store a digital low. The result is a mask that indicates which portions have available image content and which portions do not have available image content. The use of a mask is provided as one example, and should not be considered limiting.

The processing circuitry may receive as input the pose information of the current frame (frame n), pose information of a previous fame (frame n−1), and the image content of the previous frame. The processing circuitry may have utilized the error concealment techniques described in this disclosure when generating the previous frame, but the techniques are not so limited.

The processing circuitry may warp the image content of the previous frame based on the pose information of the previous frame and the pose information for the current frame. This warping operation is to reorient the image content in the previous frame to the orientation of the current frame. Example warping techniques include asynchronous time warp (ATW), ATW with depth, asynchronous space warp (ASW), ASW with depth, and other techniques. All of these example techniques for warping may be available in the techniques described in this disclosure, and be may be based on how much data is available in the bitstream to perform these operations.

The result of the warping operation is a warped frame, where the warped frame is the warping of the previous frame so that it is in the same orientation as the current frame. The processing circuitry may then use the warped frame to fill in the missing portions of the frame generated by the video decoder to generate the final error concealed frame.

This final error concealed frame may then be a previous frame for the next frame. In some examples, the processing circuitry may store this final error concealed frame in the frame buffer of the video decoder so that the video decoder uses this final error concealed frame as a predictive frame, such as in examples where the server performs similar error concealment techniques as part of the encoding as described below. However, the processing circuitry may store the final error concealed frame in the frame buffer so that the video decoder uses this final error concealed frame as a predictive frame even in examples where the server does not perform similar error concealment techniques. Error concealed frame means that portions of image content that were lost (e.g., not received or corrupted) are replaced by image content that is a good approximation of the lost image content. Error concealed frame does not necessarily mean that the error concealed frame is exactly the same as the current frame. However, in some cases, the error concealment techniques may be good enough to provide a copy of the current frame as if there was no missing image content.

In some examples, the mask may be a "running mask" that not only indicates portions in the current frame for which there was missing image content but indicates portions in one or more previous frames for which there was missing image content. For example, assume that for a previous frame, image content information for location (x1, y1) to (x2, y2) in the previous frame was missing. Assume that for a current frame, image content information for location (x3, y3) to (x4, y4) in the current frame is missing. In some examples, the mask for the current frame may indicate that there is missing information for location (x3, y3) to (x4, y4) and there is missing information for location (x1, y1) to (x2, y2) even if for the current frame image content for location (x1, y1) to (x2, y2) is received.

One example way to generate the running mask is by performing the AND operation on each generated mask. For example, for a first frame, the processing circuitry may generate a first mask. For the second frame, the processing circuitry may generate a temporary second mask, where the temporary second mask indicates only the portions missing in the second frame. The processing circuitry may perform the AND operation on the temporary second mask with the first mask to generate a second mask that indicates portions for which image content information is missing in the first frame and in the second frame. In some examples, the processing circuitry may perform a warping operation on the first mask similar to what was performed on the previous frame to generate a warped first mask. The processing circuitry may perform the AND operation on the temporary second mask and the warped first mask to generate a second mask that indicates portions for which image content information is missing in the first frame and in the second frame. For a third frame, the processing circuitry may generate a temporary third mask, where the temporary third mask indicates only the portions missing in third frame. The processing circuitry may perform the AND operation on the temporary third mask with the second mask (or a warped second mask generated from warping the second mask) to generate a third mask that indicates portions for which image content information is missing in the third frame, second frame, and first frame.

The processing circuitry may repeat these operations until the video decoder receives a frame that has not been encoded using any other frame, referred to as an I-frame. After reception of the I-frame, the processing circuitry may clear out the running mask, and generate a new running mask for a frame received after the I-frame that is generated based on image content in a reference frame. The above is one example way in which to generate a mask, and other techniques may also be used. Furthermore, the AND operation is provided as one example, and based on the specific way in which a mask is generated, other operations such as OR may be used instead.

The generation of a running mask is not necessary in every example. The term mask may refer to a running mask or a mask indicating missing portions for only the current frame. Examples where a running mask may be used are described in more detail below.

Utilizing pose information for error concealment may provide better error concealment than techniques that do not use pose information. In some cases, the error concealment techniques in this disclosure may be sufficiently effective that the server can purposely drop image content.

In some examples, as part of the encoding, the server may not encode certain image content, and replace the image content with image content generated using the techniques described in this disclosure (e.g., using a warped frame as described above). The server may compare the image content used to replace the missing image content with the actual image content. If the difference in the image content is relatively small, the server may not encode and transmit that image content, which reduces the amount of data that needs to be sent. For instance, the server may determine that the error concealment techniques on the HMD device are good enough to replace the missing image content with minimal negative impact. Therefore, to save bandwidth, the server may not encode those portions.

In some examples, the server may also output information that indicates the manner in which the processing circuitry on the HMD device should generate the warped frame (e.g., which warping algorithm the processing circuitry should use) to minimize the impact of the image content that the server did not send on purpose.

The processing circuitry on the HMD device may be configured to evaluate the quality of any replaced image content (e.g., if any discontinuations in the image content) from the warped frame. If the quality is not sufficiently high, the HMD device may output a request to receive the data.

FIG. 1 is a block diagram illustrating split-rendered system 2 including a host device 10 and wearable display device 16. In the example of FIG. 1, split-rendered system 2 includes host device 10 and only one client device, i.e., wearable display device 16. In other examples, split-rendered system 2 may include additional client devices (not shown), which may comprise wearable display devices, wireless devices or wired devices with wireless communication capabilities.

In some examples, split-rendered system 2 may conform to the Wi-Fi Direct (WFD) standard defined by the Wi-Fi Alliance. The WFD standard enables device-to-device communication over Wi-Fi networks, e.g., wireless local area networks, in which the devices negotiate their roles as either access points or client devices. Split-rendered system 2 may include one or more base stations (not shown) that support a plurality of wireless networks over which a peer-to-peer (P2P) group communication session may be established between host device 10, wearable display device 16, and other participating client devices. A communication service provider or other entity may centrally operate and administer one or more of these wireless networks using a base station as a network hub.

According to the WFD standard, host device 10 may act as a wireless access point and receive a request from wearable display device 16 to establish a P2P group communication session. For example, host device 10 may establish the P2P group communication session between host device 10 and wearable display device 16 using the Real-Time Streaming Protocol (RTSP). The P2P group communication session may be established over a wireless network, such as a Wi-Fi network that uses a wireless communication standard, e.g., IEEE 802.11a, 802.11g, or 802.11n improvements to previous 802.11 standards.

Once the P2P group communication session is established, host device 10 may send image content information, which may include audio video (AV) data, audio data, and/or video data, to wearable display device 16, and any other client devices, participating in the particular P2P group communication session. For example, host device 10 may send the image content information to wearable display device 16 using the Real-time Transport protocol (RTP). The image content information may be played back at display screens of wearable display device 16, and possibly at host device 10 as well. It should be understood that display of content at host device 10 is merely one example, and is not necessary in all examples.

For instance, in a gaming application, host device 10 may be a server receiving information from each of multiple users, each wearing an example wearable display device 16. Host device 10 may selective transmit different image content to each one of devices like wearable display device 16 based on the information that host device 10 receives. In such examples, there may be no need for host device 10 to display any image content.

Wearable display device 16 may process the image content information received from host device 10 for presentation on its display screens and audio equipment. Wearable display device 16 may perform these operations with a computer processing unit and graphics processing unit that are limited by size and weight in order to fit within the structure of a handheld device. In addition, host device 10 may perform at least some processing of the image content information for presentation on wearable display device 16.

A user of wearable display device 16 may provide user input via an interface, such as a human interface device (HID), included within or connected to wearable display device 16. An HID may comprise one or more of a touch display, an input device sensitive to an input object (e.g., a finger, stylus, etc.), a keyboard, a tracking ball, a mouse, a joystick, a remote control, a microphone, or the like. As shown, wearable display device 16 may be connected to one or more body sensors and actuators 12 via universal serial bus (USB), and body sensors and actuators 12 may be connected to one or more accessories 14 via Bluetooth™.

Wearable display device 16 sends the provided user input to host device 10. In some examples, wearable display device 16 sends the user input over a reverse channel architecture referred to as a user input back channel (UIBC). In this way, host device 10 may respond to the user input provided at wearable display device 16. For example, host device 10 may process the received user input and apply any effect of the user input on subsequent data sent to wearable display device 16.

Host device 10 may be either a wireless device or a wired device with wireless communication capabilities. In one example, as a wired device, host device 10 may comprise one of a television, monitor, projector, set-top box, DVD or Blu-Ray Disc player, digital video recorder, laptop or desktop personal computer, video game console, and the like, that includes wireless communication capabilities. Other examples of host device 10 are possible.

For example, host device 10 may be a file server that stores image content, and selectively outputs image content based on user input from display device 16. For instance, host device 10 may store 360-degree video content, and based on user input may output selected portions of the 360-degree video content. In some examples, the selected portions of the 360-degree video content may be pre-generated and pre-stored video content. In some examples, host device 10 may generate the image content on-the-fly using the high end graphics processing units (GPUs) illustrated in FIG. 1 and described in more detail below in all examples. In examples where host device 10 transmits pre-stored video content, host device 10 need not necessarily include the GPUs. Host device 10 may be proximate to wearable display device 16 (e.g., in the same room), or host device 10 and wearable display device 16 may be in different locations.

As shown, host device 10 may be connected to a router 8 and then connects to the (e.g., the Internet) via a local area network (LAN). In another example, as a wireless device, host device 10 may comprise one of a mobile telephone, portable computer with a wireless communication card, personal digital assistant (PDA), portable media player, or other flash memory device with wireless communication capabilities, including a so-called "smart" phone and "smart" pad or tablet, or another type of wireless communication device (WCD).

Wearable display device 16 may comprise any type of wired or wireless display device that is worn on a user's body. As an example, wearable display device 16 may comprise a head-worn display or a head-mounted display (HMD) that is worn on a user's head in order to position one or more display screens in front of the user's eyes. In general, the display screens of wearable display device 16 may comprise one of a variety of display screens such as a liquid crystal display (LCD), a plasma display, an organic light emitting diode (OLED) display, or another type of display screen.

In one example, wearable display device 16 may comprise a HMD device formed as glasses that include display screens in one or more of the eye lenses, and also include a nose bridge and temple arms to be worn on a user's face. As another example, wearable display device 16 may comprise a HMD device formed as goggles that includes display screens in separate eye lenses or a single display screen, and that also includes at least one strap to hold the goggles on the user's head. Although wearable display device 16 is primarily described in this disclosure as being a HMD, in other examples wearable display device 16 may comprise display devices that are worn on other portions of the user's body, such as on the user's neck, shoulders, arm or wrist.

In the example of FIG. 1, wearable display device 16 outputs sensor and/or actuator data to host device 10. The sensor and/or actuator data may include eye pose data indicating a user's field of view and/or pose of wearable display device 16. In response to receiving the sensor and/or actuator data, host device 10 generates image content information for rendering a frame. For example, host device 10 may generate a compressed video and audio buffer using eye and device pose data indicated by the sensor and/or actuator data.

In some examples, the transmission from host device 10 to wearable display device 16 may be lossy. For example, the image content information that host device 10 transmits may be not the exact same image content information that wearable display device 16 receives. The image content information may be dropped in transmission or there may be enough errors in the image content information that image content information is unusable.

Such transmission errors result in wearable display device 16 being unable to reconstruct an entire image frame. There may be gaps in the reconstructed image frame due to the error-filed or generally lost image content information (e.g., lost image content information referring to error-filed or not received image content). As an example, host device 10 may packetize the image content information of a frame as image content information for a plurality of separately decodable slices. If image content information for a slice is lost (e.g., not received or error-filed), then host device 10 may not be able to reconstruct the image content of that slice.

Because there can be transmission errors, wearable display device 16 may be configured to perform error concealment. As one example, wearable display device 16 may copy image content of blocks of a previously decoded frame that are in the same location as the image content of blocks in the current frame that were not reconstructed. As another example, wearable display device 16 may copy the motion vector of blocks neighboring the block that were not reconstructed as the motion vector for blocks that were not reconstructed, and copy the image content of the blocks referred to by the motion vectors.

For instance, in video coding techniques, a motion vector is a vector for a block that refers to a predictive block in another picture. Wearable display device 16 may receive the residual between the predictive block and current block, and add the residual to the predictive block to reconstruct the current block. In some examples, if the image content information for the current block is missing (e.g., the motion vector and residual information is missing), wearable display device 16 may copy the motion vector of the neighboring block as the motion vector for the current block, and copy the image content of the block pointed to by the motion vector to conceal the error of not being able to reconstruct the current block.

In these techniques, older image content (e.g., image content of previously decoded pictures) is extrapolated to fill in holes in the current frame being reconstructed. However, there may be certain issues with these techniques. For instance, in a VR system, evolution of older frames into newer ones is strongly correlated with evolution of viewer pose. These techniques that rely simply on image content of previous frames fail to account for the pose of the user or wearable display device 16.

As an example, the previous frame may have been referenced to a particular pose of the user or wearable display device 16. However, by the time the current frame is being reconstructed, the pose of the user or wearable display device 16 may have changed. By substituting image content of the previous picture into the holes of the current picture without accounting for the change in pose, wearable display device 16 may render the current frame using image content that is a poorer estimation of the actual image content that was missing. In such cases, the error concealment operations may result in subpar error concealment as the image content used to substitute the missing image content does not represent the missing image content.

Moreover, there may be misalignment with the filled in image content, via concealment techniques that do not account for pose, and the neighboring image content that was correctly received. This may result in the image content not being smooth, and the image content may appear disjointed. For example, an object may appear broken or bent due to the misalignment.

In the example techniques described in this disclosure, wearable display device 16 may utilize pose information for generating blocks of image content that is to substitute for the missing image content. For instance, wearable display device 16 may receive information indicating the pose (e.g., of the user's eyes or head or pose of wearable display device 16) with which an image frame is associated. As an example, frame n−1 is associated with a first pose, i.e., first combination of pitch, roll, and yaw, and frame n is associate with a second pose, i.e., a second combination of pitch, roll, and yaw. Rather than simply relying on the image content in frame n−1 to substitute for missing image content in frame n, wearable display device 16 may warp the image content of frame n−1 based on the pose information associated with frame n−1 and frame n. For instance, wearable display device 16 may warp the image content of frame n−1 such that the warped image content is referenced to the same pose as that of frame n. Wearable display device 16 may then substitute the missing content in frame n based on the warped image content.

Because the warped image content is based on pose information, the warped image content may be a better estimate of the missing image content as compared to image content of frame n−1. Using warped image content may produce technological improvements in wearable display device 16 because wearable display device 16 generates image content that is closer to the actual image content in cases where there is loss of data in a bitstream that wearable display device 16 receives from host device 10.

In some cases, the warped image content may be a full substitute for the missing content. For example, the difference between the actual image content of blocks in a current frame and warped image content of blocks from a previous frame is nominal (e.g., less than 10%, less than 5%, less than 2%, or less than 1%). In such cases, it may be possible for host device 10 to not transmit image content information for certain portions of the frame to save bitstream bandwidth. Wearable display device 16 may perform the error concealment techniques described in this disclosure to fill in the missing image content.

Accordingly, in some examples, wearable display device 16 may perform the example techniques described in this disclosure for error concealment in cases where there is loss of image content information or errors in the image content information to fill in the portions of a frame that wearable display device 16 did not reconstruct. Additionally or alternatively, wearable display device 16 may perform the example techniques described in this disclosure to fill in missing image content for portions of the frame in cases where host device 10 did not send the image content information for the portions of frame. In such examples, host device 10 may additionally transmit information indicating for which portions host device 10 did not transmit image content information as well as information indicating the manner in which to perform the warping. However, transmitting of such additional information is not necessary in every example, and may be optional.

Figure 2:
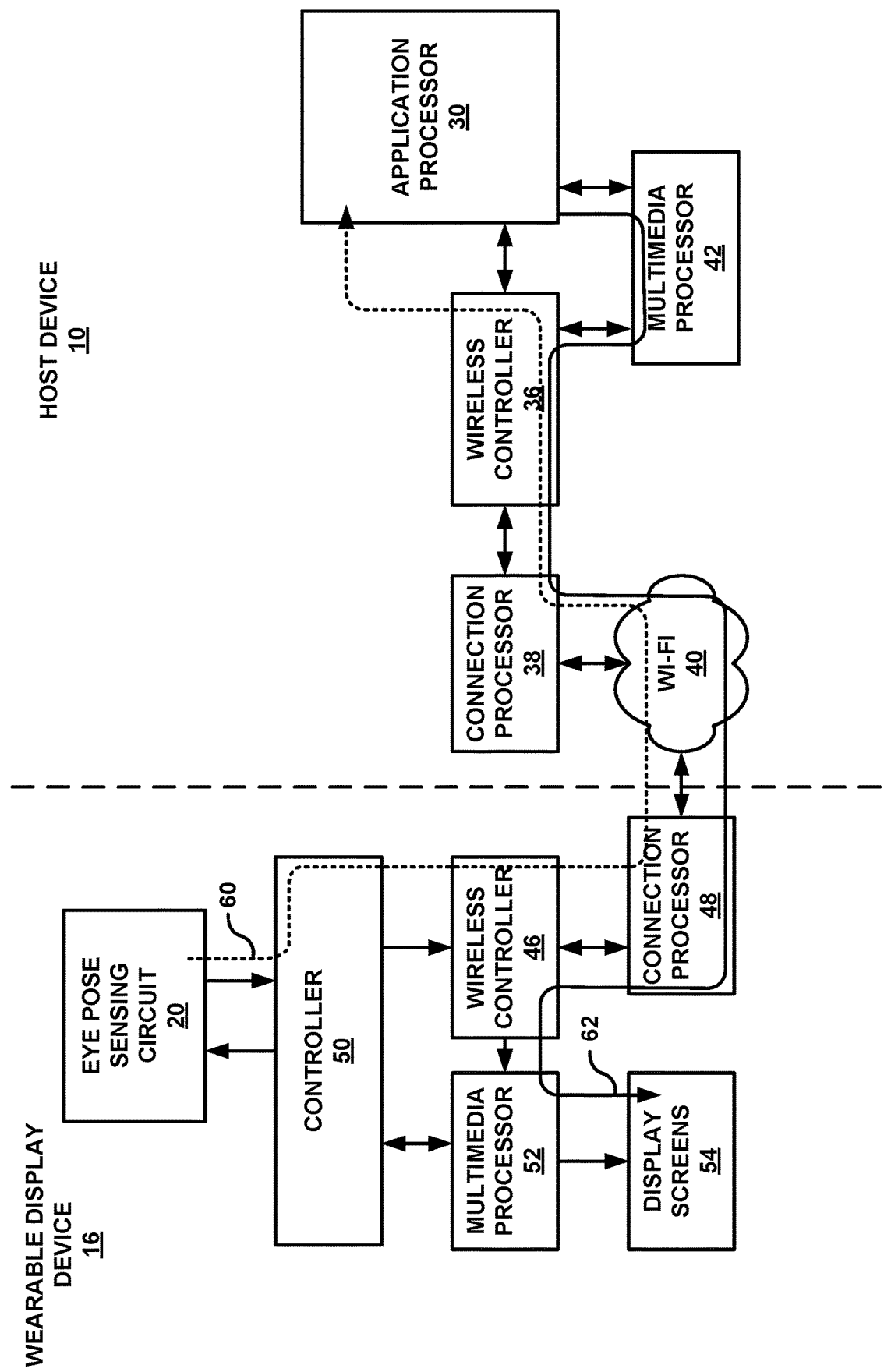
FIG. 2 is a block diagram illustrating the host device and wearable display device from FIG. 1 in greater detail.

FIG. 2 is a block diagram illustrating host device 10 and wearable display device 16 from FIG. 1 in greater detail. For purposes of this disclosure, host device 10 and wearable display device 16 will primarily be described as being wireless devices. For example, host device 10 may comprise a server, a smart phone or smart pad, or other handheld WCD, and wearable display device 16 may comprise a WHMD device. In other examples, however, host device 10 and wearable display device 16 may comprise either wireless devices or wired devices with wireless communication capabilities.

In the example illustrated in FIG. 2, host device 10 includes circuitry such as an application processor 30, a wireless controller 36, a connection processor 38, and a multimedia processor 42. Host device 10 may comprise additional circuitry used to control and perform operations described in this disclosure.

Application processor 30 may comprise a general-purpose or a special-purpose processor that controls operation of host device 10. As an example, application processor 30 may execute a software application based on a request from wearable display device 16. In response, application processor 30 may generate image content information. An example of a software application that application processor 30 executes is a gaming application. Other examples also exist such as a video playback application, a media player application, a media editing application, a graphical user interface application, a teleconferencing application or another program. In some examples, a user may provide input to host device 10 via one or more input devices (not shown) such as a keyboard, a mouse, a microphone, a touch pad or another input device that is coupled to host device 10 to cause host device 10 to execute the application.

The software applications that execute on application processor 30 may include one or more graphics rendering instructions that instruct multimedia processor 42, which includes the high end GPU illustrated in FIG. 1, to cause the rendering of graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application processor 30 may issue one or more graphics rendering commands to multimedia processor 42 to cause multimedia processor 42 to perform some or all of the rendering of the graphics data. In some examples, the graphics data to be rendered may include a list of graphics primitives, e.g., points, lines, triangles, quadrilaterals, triangle strips, etc.

Multimedia processor 42 may generate image content for many different perspectives (e.g., viewing angles). Therefore, multimedia processor 42 may include a GPU that is capable of performing operations to generate image content for many different perspectives in a relatively short amount of time.

As illustrated in FIG. 2, wearable display device 16 includes eye pose sensing circuit 20, wireless controller 46, connection processor 48, controller 50, multimedia processor 52, and display screens 54. Controller 50 comprises a main controller for wearable display device 16, and controls the overall operation of wearable display device 16.

Controller 50 may comprise fixed function circuitry or programmable circuitry, examples of which include a general-purpose or a special-purpose processor that controls operation of wearable display device 16. A user may provide input to wearable display device 16 to cause controller 50 to execute one or more software applications. The software applications that execute on controller 50 may include, for example, a gaming application, an operating system, a word processor application, an email application, a spread sheet application, a media player application, a media editing application, a graphical user interface application, a teleconferencing application or another program. The user may provide input to wearable display device 16 via one or more input devices (not shown) such as a keyboard, a mouse, a microphone, a touch pad or another input device that is coupled to wearable display device 16.

The software applications that execute on controller 50 may include one or more graphics rendering instructions that instruct multimedia processor 52 to cause the rendering of graphics data. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, application controller 50 may issue one or more graphics rendering commands to multimedia processor 52 to cause multimedia processor 52 to perform some or all of the rendering of the graphics data. In some examples, the graphics data to be rendered may include a list of graphics primitives, e.g., points, lines, triangles, quadrilaterals, triangle strips, etc.

Display screens 54 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display screens 54 may be integrated within wearable display device 16. For instance, display screens 54 may be a screen of a mobile telephone handset or a tablet computer. Alternatively, display screens 54 may be a stand-alone device coupled to wearable display device 16 via a wired or wireless communications link.

Eye pose sensing circuit 20 may include sensors and/or actuators for generating information indicative of a user's field of view. For example, eye pose sensing circuit 20 may generate eye pose data (e.g., via accelerometers, eye-tracking circuitry, and the like) that indicates an angle of rotation of wearable display device 16 and a position of wearable display device 16.

As shown, the transfer of eye pose data from wearable display device 16 to host device 10 is illustrated as a path 60. Specifically, controller 50 may receive eye pose data from eye pose sensing circuit 20. Multimedia processor 52 may receive eye pose data from controller 50. Wireless controller 46 packages the eye pose data, and connection processor 48 transmits the packaged user input over a wireless network, such as Wi-Fi network 40, to host device 10. At host device 10, connection processor 38 receives the transmitted eye pose data, and wireless controller 36 unpackages the received user input for processing by multimedia processor 42. In this way, host device 10 may generate image content for a particular eye pose of a user's field of view.

In general, host device 10 generates image content information for presentation at display screens 54. More specifically, multimedia processor 42 may generate image content information for a user's field of view that is indicated by eye pose data generated by eye pose sensing circuit 20. For example, multimedia processor 42 may generate image content information that indicates one or more primitives arranged in a user's field of view that is indicated by eye pose data generated by eye pose sensing circuit 20. In some examples, multimedia processor 42 may generate image content information that indicates a two-dimensional frame representative of the user's field of view.

Multimedia processor 42 may then encode the frames of image content to generate a bitstream of image content information for transmission to wearable display device 16. Multimedia processor 42 may encode the frames using any one of various video coding techniques such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards.

In the example of FIG. 2, wearable display device 16 may receive, via path 62, image content information from host device 10. To transfer image content information from host device 10 to wearable display device 16, path 62 may begin at application processor 30.

Application processor 30 provides an environment in which a variety of applications may run on host device 10. Application processor 30 may receive data for use by these applications from internal or external storage location and/or internal or external sensors or cameras associated with host device 10. The applications running on application processor 30, in turn, generate image content information for presentation to a user of host device 10 and/or wearable display device 16. In other examples, path 62 may begin at multimedia processor 42 or some other functional device that either generates image content information or receives image content information directly from the storage locations and/or sensors or cameras.

Multimedia processor 42 may process the received image content information for presentation on display screens 54 of wearable display device 16. Wireless controller 36 packages the processed data for transmission. Packaging the processed data may include grouping the data into packets, frames or cells that may depend on the wireless communication standard used over Wi-Fi network 40. Connection processor 38 then transmits the processed data to wearable display device 16 using Wi-Fi network 40. Connection processor 38 manages the connections of host device 10, including a P2P group communication session with wearable display device 16 over Wi-Fi network 40, and the transmission and receipt of data over the connections.

The transfer of the image content information continues along path 62 at wearable display device 16 when connection processor 48 receives the transmitted data from host device 10. Similar to connection processor 38 of host device 10, connection processor 48 of wearable display device 16 manages the connections of wearable display device 16, including a P2P group communication session with host device 10 over Wi-Fi network 40, and the transmission and receipt of data over the connections. Wireless controller 46 unpackages the received data for processing by multimedia processor 52.

The image content information that multimedia processor 52 receives includes information indicating the pose with which a frame is associated. Multimedia processor 52 may also receive information such as prediction modes, motion vectors, residual data and the like for decoding the encoded image content (e.g., for decoding blocks of a frame of image content). As an example, a frame may include a plurality of individually decodable slices. Multimedia processor 52 may receive image content information such as prediction modes, motion vectors, and residual data for blocks within each of the slices.

There may be various ways in which multimedia processor 52 receives information indicating the pose with which a frame is associated. As one example, each packet/slice includes the rendering pose in a field such as the Real-time Transport Protocol (RTP) header. As another example, the RTP header may include a time stamp of a pose, rather than the actual pose information. In such examples, multimedia processor 52 may store, in a buffer, time stamps of different poses determined by eye pose sensing circuit 20. Multimedia processor 52 may then determine the pose information associate with the frame based on the received time stamp and the time stamps stored in the buffer (e.g., the received time stamp is an entry in the buffer of pose information to determine the pose information associated with the frame). Other ways to indicate the pose associated with a frame are possible.

In the example techniques described in this disclosure, multimedia processor 52 may use the pose information of frames to warp image content to fill in portions of a frame that could not be reconstructed. Such filling of portions of the frame may be for error concealment or as part of constructing the frame.

For example, along path 62, such as at the output of connection processor 38, the output of Wi-Fi network 40, output of connection processor 48, and/or output of wireless controller 46, there may be loss of packets or there may be errors in the packets such that multimedia processor 52 cannot reconstruct the image content included into those packets. Multimedia processor 52 may substitute image content from warped image content of a previous frame for the missing image content of the current frame (e.g., portions of the current frame multimedia processor 52 could not reconstruct).

For instance, multimedia processor 52 may determine which portions of the current frame cannot be reconstructed (e.g., due to dropped information or errors in the bitstream). Multimedia processor 52 may also generate warped image content based on the pose information of the current frame and a previous frame. Multimedia processor 52 may then copy the warped image content into the current frame.

Figure 3:
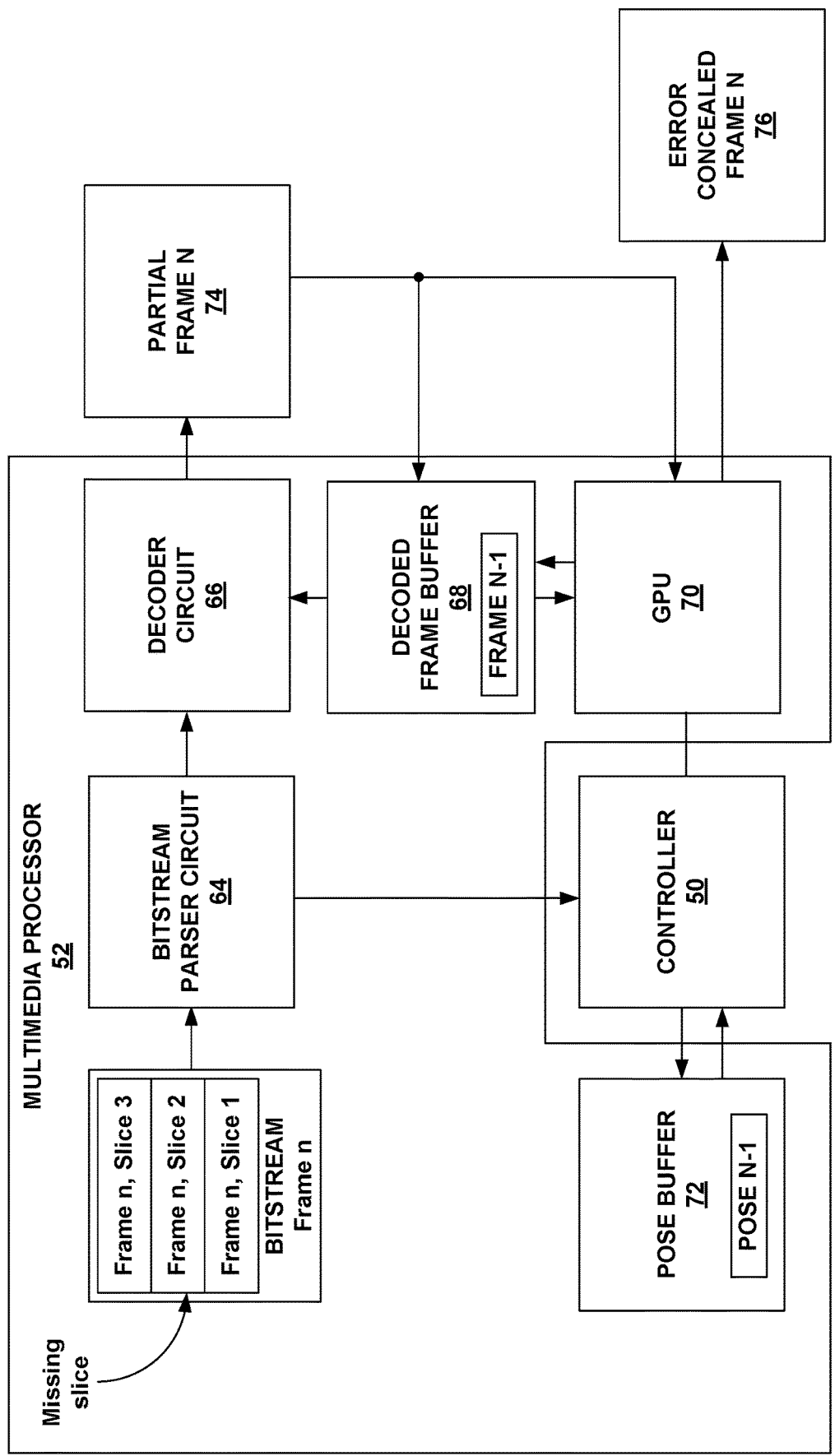
FIG. 3 is a block diagram illustrating an example of the multimedia processor of FIG. 2 in greater detail.
Figure 4:
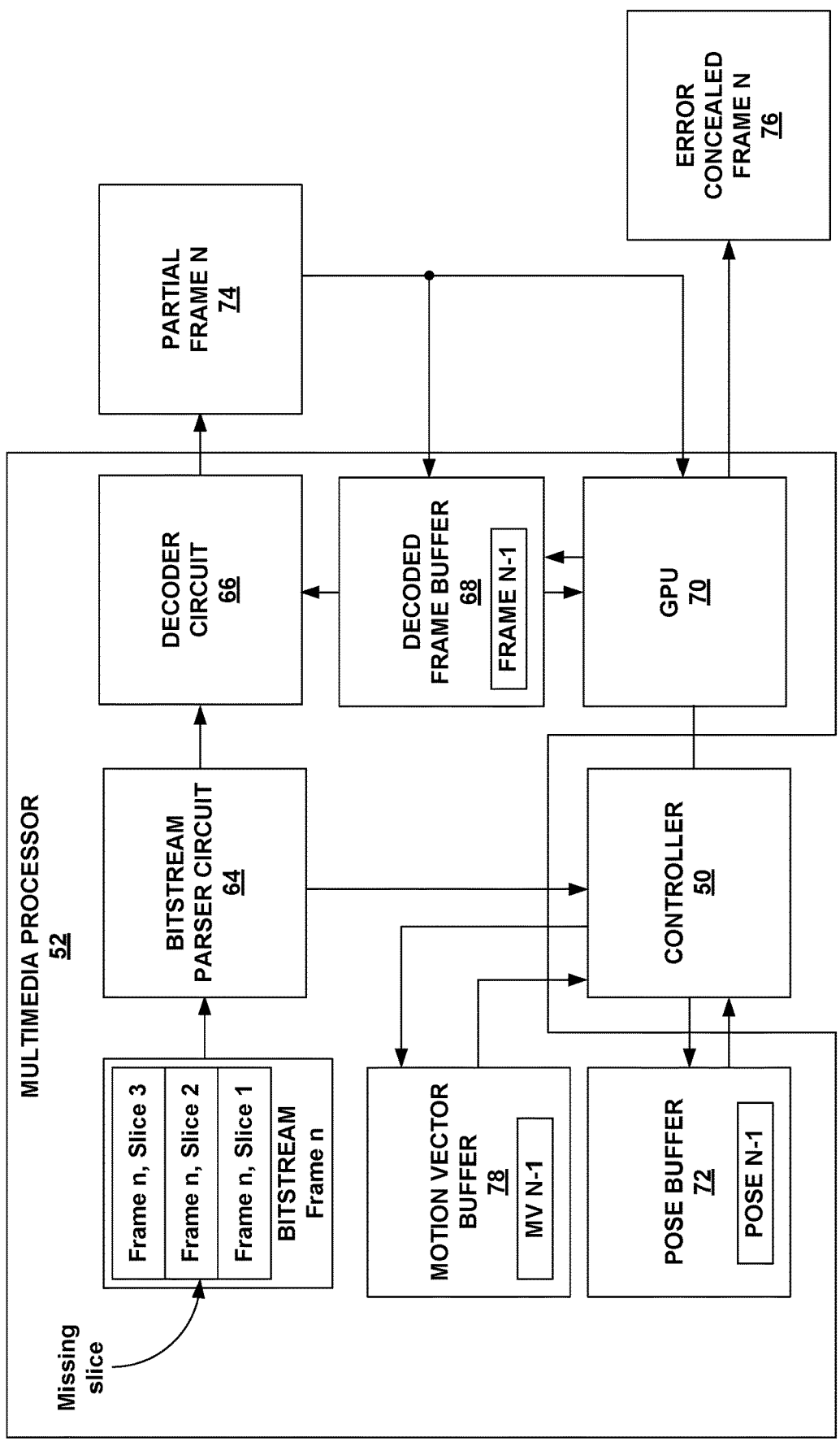
FIG. 4 is a block diagram illustrating another example of the multimedia processor of FIG. 2 in greater detail.

As an example, multimedia processor 52 may include a bitstream parser circuit, illustrated in FIGS. 3 and 4, which receives the bitstream via path 62 generated by host device 10. The bitstream parser circuit may determine portions of the current frame for which there is no image content information. For example, the bitstream parser circuit may determine for which slices of the current frame there was packet loss. Based on the determination of which slices had packet loss, controller 50 may generate a mask for the current frame. In this mask, a logic zero for a portion (e.g., slice) indicates that image content information was received, and a logic one for a portion (e.g., slice) indicates that image content information was not received. In this way, the mask indicates holes/missing macroblocks in the frame.

In addition, controller 50 may be configured to perform a homography based on the difference in the poses of the current frame and a previous frame. The previous frame may be the frame that is displayed or is to be displayed immediately before the current frame. In some examples, the previous frame may be the frame that is decoded immediately before the current frame. However, the techniques are not so limited, and the previous frame may be any previously decoded frame, and not necessarily the immediately preceding frame in display or decoding order.

Homography is the process by which controller 50 determines where a point in the previous frame would be located in the current frame given the pose associated with the previous frame and the pose associated with the current frame. As one example, homography is a transformation where coordinates in a point in the previous frame are multiplied by a 3×3 matrix to generate the coordinates of that point in the current frame. Stated another way, homography transforms image content of an image from its perspective to the perspective of another image.

In examples described in this disclosure, the perspective associated with the previous frame is the pose information associated with the previous frame, and the perspective associated with the current frame is the pose information associated with the current frame. Controller 50 may determine the 3×3 transformation matrix (also called projection matrix) based on the pitch, roll, and yaw (e.g., pose information) of the previous frame, and the pitch, roll, and yaw (e.g., pose information) of the current frame. The pose information of the previous frame may be stored in a pose buffer, and the pose information of the current frame may be parsed from the received bitstream. Although controller 50 is described as determining the homography, the techniques are not so limited, and multimedia processor 52 may be configured to perform the homography.

The following is one example manner in which controller 50 may perform the homography. Assume that quaternion q1 represents the orientation of wearable display device 16 in the previous frame. For example, q1 could be in the OpenGL format glm::quat. Similarly, q2 represents the quaternion of orientation of wearable display device 16 for the current frame. Controller 50 may first determine the difference between the orientations as a third quaternion q3=glm::inverse(q2)*q1. Controller 50 may compute the homography corresponding to this difference using the method glm::mat4_cast(q3) in accordance with the OpenGL API.

Multimedia processor 52 may include a decoder circuit that is configured to use the image content information in the bitstream to reconstruct the current frame. For instance, the decoder circuit may be configured in accordance with the example video coding techniques described above. The result of the decoding process is a current frame. However, in this current frame, there may be missing portions because image content information for these portions of the current frame was not available or had too many errors.

In some cases, the decoder circuit of multimedia processor 52 may be configured to perform some level of error concealment so that the output of the decoder circuit is not a frame with missing portions. However, because the decoder circuit may not use pose information of the frames, the error concealment may not be as effective at concealing the missing portions. In this disclosure, missing portions or missing image content refers to information or content that was unavailable because the information was dropped or there were too many errors. For instance, even if the decoder circuit performed some level of error concealment that does not account for pose, then the portions for which the decoder circuit performed error concealment may still be referred to as missing portions. In general, portions of the current frame for which the image content information is unavailable or too corrupt are referred to as missing portions, regardless of whether the decoder circuit performed some error concealment. The techniques described in this disclosure may be applicable even to examples where the decoder circuit does not perform any error concealment.

As described above, in performing the homography, controller 50 may determine the coordinates of where points in the previous frame would be located in the current frame. Based on the determined coordinates and the color values of the pixels in the previous frame, controller 50 may cause a graphics processing unit (GPU) of multimedia processor 52 to warp the image content of the previous frame. For example, controller 50 may output graphics commands that causes the GPU to perform the warping.

One example way in which to perform the warping is via texture mapping. In texture mapping, the GPU maps image content from a texture (e.g., the previous frame) to a frame mesh. In this example, the GPU receives the coordinates of vertices in the previous frame and coordinates for where the vertices are to be mapped for the warping based on the homography determined by controller 50. In turn, the GPU maps the image content of the vertices to points on the frame mesh determined from the homography. The result is the warped image content.

For example, to perform the homography, controller 50 determines a projection matrix based on the pose information of the previous frame and the pose information of the current frame. As described above, controller 50 may utilize OpenGL commands such as glm for computing the homography between the previous frame and the current frame. The pose information of the current information may be part of the quaternion definition of the current frame, where the quaternion is a manner in which to define a three-dimensional space. The resulting homography may be a 3×3 projection matrix, also called rotation matrix, with which the GPU performs the warping.

The GPU executes a vertex shader that transforms the vertex coordinates of primitives in the previous frame to projected vertex coordinates based on the projection matrix (e.g., rotation matrix). A texture circuit of the GPU receives the pixel values of pixels on the vertices of primitives in the previous frame, the vertex coordinates of the primitives in the previous frame, and the projected vertex coordinates. The texture circuit then maps the image content from the previous frame based on the pixel values, the vertex coordinates of the primitives in the previous frame, and the projected vertex coordinates onto a frame mesh. The GPU executes fragment shaders to generate the color values for the pixels within the frame mesh to generate the warped frame.

This example technique to generate the warped frame is referred to as applying asynchronous time warp (ATW). In some examples, controller 50 and the GPU may apply ATW with depth. For instance, in ATW, controller 50 may determine that the coordinate for each vertex in the previous frame is (x, y, 1), where each vertex is assigned a depth of 1. In ATW with depth, controller 50 may receive depth information of the previous frame, where the depth information indicates the depth of vertices in the previous frame. Controller 50 may then assign each vertex the coordinates of (x, y, z), where the z value is based on the depth indicated by the depth map. The other operations of the texture circuit may be the same.

In some examples, controller 50 may additionally or alternatively apply asynchronous space warping (ASW). In ATW or ATW with depth, controller 50 accounts for the difference in the image content from previous frame to current frame based on the difference in amount of time that elapsed. In ASW, controller 50 may account for movement of image content within the frames. For instance, controller 50 may use motion vectors of blocks in the previous frame to generate the projection matrix. Similar to ATW with depth, in some examples, controller 50 may use depth information with ASW. In ATW, ATW with depth, ASW, and ASW with depth, the manner in which controller 50 generates the projection matrix may be different. However, once the projection matrix is generated, the texture mapping techniques to generate the warped frame may be generally the same.

There may be other ways in which to perform the warping of the image content of the previous frame than the example techniques described above. For instance, the above warping techniques include asynchronous time warp (ATW), ATW with depth, asynchronous space warp (ASW), ASW with depth, and other techniques.

In some examples, the GPU may perform warping on the entirety of the previous frame to generate a warped frame. In some examples, the GPU may perform warping only on portions of the previous frame that are located in the same position as the portions of the current frame for which image content information was lost (e.g., not received or was corrupted). For instance, as described above, controller 50 may generate a mask that indicates for which portions image content information was received and for which portions image content information was not received. Based on the mask, the GPU may warp the portion of the previous frame. As described further below, in some examples, the mask may be a running mask indicating portions of image content information not received in the current frame, as well as portions of image content information not received in one or more previous frames.

The GPU may blend the warped image content with the image content in the current frame. One example way to blend is for the GPU to replace the image content in the portions of the current frame identified as not receiving image content information (e.g., from the mask) with image content from the warped image content.

Another example way to blend is for the GPU to perform an OR operation using the mask generated by controller 50. In one example, in the mask, a logic zero for a portion (e.g., slice) indicates that image content information was received, and a logic one for a portion (e.g., slice) indicates that image content information was not received.

In the OR operation, for portions for which image content was not received, as indicated by the mask (e.g., logic ones), the GPU outputs the image content from the warped image content. For portions of the mask for which image content was received, as indicated by the mask (e.g., logic zeros), the GPU outputs the image content from the current frame. The output is an error concealed frame, where the error concealing is based on the pose information of the current frame and a previous frame. As noted above, error concealed frame means that portions of image content that were lost (e.g., not received or corrupted) are replaced by image content that is a good approximation of the lost image content. Error concealed frame does not necessarily mean that the error concealed frame is exactly the same as the current frame. However, in some cases, the error concealment techniques may be good enough to provide a copy of the current frame as if there was no missing image content.

In some examples, the GPU may smooth the mask (e.g., perform an averaging or weighted average) such that the mask includes intermediate values and not just ones and zeros. These weighted values may be blending factors that indicate a percentage of image content to take from the warped image content and percentage of image content to take from the current frame, where the decoder circuit may have applied some level of error concealment that does not account for pose information. As an example, if the weighted value for the mask is one, then the GPU may copy the image content of the warped frame as the image content for the portion associated with the mask value of one. If the weighted value for the mask is 0.75, then the GPU may blend the color values of the warped image content and the color values of the current frame such that the warped image content contributes to 75% of the final color value, and current frame content contributes to 25% of the final color value.

In video coding techniques, the current frame becomes a previous frame for the next frame that is decoded. In some examples, the decoder circuit of multimedia processor 52 may store the error concealed frame as the current frame so that the error concealed frame becomes the previous frame relative to the next frame that is decoded.

However, the example techniques do not require the decoder circuit to store the error concealed frame, and may store the current frame, without the error concealment described in this disclosure, for purposes of there being a previous frame for the next frame. For example, some decoder circuits may not be configurable to store the error concealed frame, and therefore, may store the current frame without the error concealment described in this disclosure, and may be only with the error concealment performed by the decoder circuit.

In examples where the decoder circuit stores the current frame without error concealment using the techniques described in this disclosure, it is possible for propagation of error. For example, the current frame may be used as a reference frame to a next frame. It is possible that a portion of the current frame for which image content was not received is used by the decoder circuit for generating image content in the next frame. Because the portion of the current frame for which image content was not received does not include proper error concealment (e.g., because the current frame is stored in the decoder circuit and not the error concealed frame), a portion in the next frame may not appear correct due to the errors in the current frame.

To address this issue, in some examples, controller 50 may generate a running mask, where the running mask includes information indicative of portions in the current frame for which image content information is missing and portions in one or more previous frames for which image content information is missing. In this case, for the current frame, the GPU may use image content from the warped frame for all portions in the mask indicative of missing image content, which is for the current frame and one or more previous frames.

As an example, assume that the current frame is frame n, the previous frame is frame n−1, and the frame before the previous frame is frame n−2. In this example, controller 50 may have generated a first mask indicating portions in frame n−2 with missing image content. The GPU may then generate an error concealed frame n−2. Next, for frame n−1, controller 50 may have generated a temporary second mask indicating portions only in frame n−1 with missing image content. Multimedia processor 52 may warp the first mask, example with a homography for warping that has been calculated by the difference between the poses for frame n−1 and frame n−2, to calculated a warped first mask. This process could also be accomplished in the GPU in the multimedia processor 52. Subsequently, the warped first mask is combined (e.g., by controller 50 or multimedia processor 52 with AND or OR operations based on specific logic used) with the temporary second mask to generate a second mask indicative of portions in frame n−1 where content has not been received or where error from missing content in frame n−2 might have propagated from frame to frame. In this example, the GPU subsequently may generate the error concealed frame n−1 based on the second mask which flags errors from both frame n−1 and frame n−2. The second mask may be stored in a buffer in multimedia processor 52.

For example, the first mask in this example may be a previous mask. Controller 50 and/or multimedia processor 52 may warp a previous mask based on the pose information of wearable display device 16 when wearable display device 16 requested image content information of frame n−2 and the pose information of wearable display device 16 when wearable display device 16 requested image content information of frame n−1 to generate a warped mask (e.g., warped first mask). This previous mask indicates portions of one or more previous frames (e.g., frame n−2) for which image content information was lost. Multimedia processor 52 may generate the mask for frame n−1 based on the determined portions of frame n−1 for which image content information was lost (e.g., temporary second mask) and the warped previous mask (e.g., warped first mask).

Controller 50 may generate a third temporary mask indicative of portions only in frame n (e.g., current frame) with missing image content. Multimedia processor 52 may then warp the second mask to create a warped second mask based on the pose difference between frame n and frame n−1, which multimedia processor 52 or controller 50 may then combine (e.g., with AND or OR operations based on specific logic used) with the temporary third mask to generate a third mask (e.g., current mask) indicative of portions in frame n (e.g., current frame) that has errors due to missing content in frame n, frame n−1 and frame n−2 that may have propagated from frame to frame. In this example, the GPU may generate the error concealed frame n (e.g., error concealed current frame) based on the third mask which flags errors from frame n, frame n−1, and frame n−2. The third mask may be stored in a buffer in multimedia processor 52.

For example, the second mask in this example may be a previous mask. Controller 50 and/or multimedia processor 52 may warp a previous mask based on the pose information of wearable display device 16 when wearable display device 16 requested image content information of the previous frame and the pose information of wearable display device 16 when wearable display device 16 requested image content information of the current frame to generate a warped mask (e.g., warped second mask). This previous mask indicates portions of one or more previous frames for which image content information was lost. Multimedia processor 52 may generate the mask for the current frame (e.g., third mask or current mask) based on the determined portions of the current frame for which image content information was lost (e.g., temporary third mask) and the warped previous mask (e.g., warped second mask).

Multimedia processor 52 may keep updating the current mask until a frame that is to be decoded only based on image content in the frame itself, a so-called intra frame or I-frame. When an I-frame is received, controller 50 and/or multimedia processor 52 may clear the running mask and reset it to identify only the portions missing in the current I-frame. Multimedia processor 52 may then keep updating the mask until another I-frame is received or the bitstream is stopped. In this disclosure, the mask may be the running mask or a non-running mask (e.g., mask that indicates portions with missing image content only for the current frame and for no previous frame).

In some examples, controller 50 or multimedia processor 52 may determine whether the number of portions of the current frame for which error concealment was needed is greater than a threshold, and if greater than a threshold, may request host device 10 to transmit frames that do not use previous frames for decoding (e.g., I-frames). For instance, if the number of portions of the current frame that needed error concealment is greater than the threshold, then controller 50 or multimedia processor 52 may determine that the current frame, even with error concealment, is of insufficient quality to be a predictive frame.

In response, controller 50 or multimedia processor 52 may request that host device 10 not use the current frame for prediction purposes (e.g., the current frame should not be used for inter-prediction of a subsequent frame). Controller 50 or multimedia processor 52 may request for the next frame to be intra-predicted.

This disclosure describes warping by the GPU on multimedia processor 52 for purposes of error concealment. However, there may be other purposes of warping as well, and warping for these other purposes should not be confused with the warping described in this disclosure.

For example, in split-rendered systems, there is a possibility that the user changed his or her eyes or head from the position they were in when the request of the image content information was transmitted. As an example, multimedia processor 52 received a frame associated with time n−1 (i.e., frame n−1, also called previous frame). At time n, multimedia processor 52 requested for a frame associated with time n (i.e., frame n, also called current frame). However, some of time elapsed from when multimedia processor 52 requested for frame n to when multimedia processor 52 received frame n. For example, from the time that multimedia processor 52 requested for frame n to the time when multimedia processor 52 received frame n is not instantaneous but could be in the order of a few milliseconds to hundreds of milliseconds. During this time, it is possible that the user moved his or her head or the pose of wearable display device 16 changed. To account for this change in position, multimedia processor 52 may perform a warping operation on the current frame to be aligned with the current pose.

The warping of the image content from the previous frame for error concealment is different than the warping of the image content of the current frame for updating based on most recent pose information. For instance, in some examples, the GPU of multimedia processor 52 may first warp the image content from the previous frame for error concealment, and generate an error concealed current frame, as described above. Next, the GPU may perform another round of warping on the error concealed current frame based on the most recent pose information to generate the final frame that is displayed. Accordingly, there may be two rounds of warping: the first one is for error concealment, and the warping is done on the previous frame, and the second one is for display, and the warping is done on the current, error concealed frame.

In some examples, it may be possible to perform both warping operations with a single instruction (e.g., shading call) from controller 50 to multimedia processor 52. For example, controller 50 may issue an instruction (e.g., shading call) instructing multimedia processor 52 to render an image frame. In response to this single shading call, multimedia processor 52 may first perform warping to generate the error concealed frame, and then perform warping to generate the frame for display.

In some cases, it may be possible that the error concealment techniques described in this disclosure are so accurate that the warped image content is a sufficient substitute of the actual image content. Accordingly, in some examples, to save bandwidth, host device 10 may test whether substituting image content for a portion from warped image content portion of a previous frame results in close approximation of the actual image content for that portion. For instance, prior to transmission, host device 10 may compare warped image content from a previous frame that corresponds to a portion in the current frame with the actual image content of the current frame (e.g., determine a sum-of-absolute-difference (SAD) between color values). If the difference is less than a threshold, host device 10 may not transmit image content information for that portion, which saves transmission bandwidth.

In such examples, controller 50 may determine that there is a portion in the current frame for which image content information was not received, and form the mask as described above. Multimedia processor 52 may then perform the example operations described in this disclosure to substitute the warped image content to generate the error concealed frame. In such examples, it may be possible for the error concealed frame to be the predictive frame for the next frame.

Stated another way, host device 10 may replicate the error concealment techniques described in this disclosure and determine how well portions of warped previous frame approximate portions of current frame (e.g., determine sum of absolute difference (SAD) between the portions). If the approximation is relatively good (e.g., the SAD value is below a SAD value threshold), then host device 10 may deliberately drop packets that include image content information for those portions from the bitstream, resulting in lower bit-rate and latency. In some examples, host device 10 may also use the network conditions along path 62 for determining whether to drop packets. For instance, if the network connection is poor, host device 10 may determine that fewer packets should be transmitted, and in turn may set the SAD value threshold higher. In this case, although more portions would be approximated with warped image content, as compared to lower SAD value threshold, there is a higher likelihood that packets that are sent are received with fewer errors.

In examples where host device 10 drops packets by design, host device 10 may provide additional information indicating areas for where host device 10 did not send image content information. Host device 10 may also send information such as the warping technique to be used. Such information may increase the amount of data that host device 10 sends, but may result in better reconstruction of the image content by multimedia processor 52.

For instance, host device 10 may associate each portion (e.g., slice) with a flag to indicate whether the portion is approximated by the warping techniques described in this disclosure. Host device 10 may transmit such flags in the auxiliary data of every slice in the frame. Multimedia processor 52 may conceal the image content of the portions for which image content information was not received using the techniques described in this disclosure, including performing the warping based on the warping technique identified by host device 10.

In some examples, multimedia processor 52 may request for retransmission of image content of portions that host device 10 indicates will not be concealed well (e.g., based on the received flags). Multimedia processor 52 may also request that the current frame not be used for inter-prediction, and may direct appropriate insertion of portions within the same frame (e.g., intra-prediction) for subsequent frames.

Multimedia processor 52 may also be configured to determine whether the error concealment quality is sufficiently high. For example, multimedia processor 52 may determine whether there is any discontinuity in the color values at the border between actual image content of a portion of the current frame for which multimedia processor 52 received image content information, and a portion of the current frame for which multimedia processor 52 substituted image content from warped image content of previous frame. If there is discontinuity (e.g., measured by SAD, large edge value, or other techniques), then multimedia processor 52 may output a request to host device 10 for retransmission of the image content, or may attempt different warping techniques until the discontinuity is minimized.

As described above, multimedia processor 52 may perform warping of a previous frame for error concealment. However, the image content of the previous frame and the image content of the current frame need not be the same because the field of views (e.g., pose information) of the previous and current frame may be different. In some examples, the time difference between the pose information used to determine the warping is indicative of system latency. As system latency increases, an amount of warping/rotation may increase.

As more warping/rotating is needed, there is a possibility of black regions or artifacts in the periphery of the error concealed frame. For example, the current frame may include image content that is not present in the previous frame. Therefore, after the previous frame is warped to be in same field of view as the current frame, there may be black regions in the warped image content because there was no image content in the previous frame that corresponded to the location. In some cases, such as where the previous frame represents image content at a time that is relatively a long time before the current frame, the amount of warping needed may result in the blank regions.

To address such warping artifacts, in some examples, host device 10 may be configured to send an increased field-of-view (FOV) of image content so that there is available image content in the previous frame that when warped can replace portions of the current frame with missing image content information. The amount by which the FOV is increased may be based on the network latency (e.g., how long it takes data to get through path 62). For low network latency, the FOV may not be increased, but for high network latency, the FOV may be increased.

For example, in low network latency, not much time may have elapsed from reception of previous frame to reception of current frame, which means that there is not much time for the viewer to change his or her pose. Therefore, additional FOV may not be needed as there will be fewer blank regions. Again, the blank regions occur if there is substantial change in the pose such that there is not sufficient image content from the previous frame for effective warping.

In high network latency, much time may have elapsed from reception of previous frame to reception of current frame, which means that there is time for the viewer to change his or her pose. Therefore, additional FOV may be needed as there is a higher likelihood of blank regions. For instance, if there is a relatively large change in pose, the additional FOV of the previous frame (which may not have been visible when the previous frame is displayed) will provide the image content for the warping to generate the error concealed current frame.

FIG. 3 is a block diagram illustrating an example of multimedia processor 52 of FIG. 2 in greater detail. As illustrated, multimedia processor 52 includes bitstream parser circuit 64, decoder circuit 66, decoded frame buffer (DFB) 68, GPU 70, and pose buffer 72. Pose buffer 72 and/or DFB 68 may be external to multimedia processor 52 in some examples.

Multimedia processor 52 may include more or less circuitry than illustrated in FIG. 3. The illustrated circuits within multimedia processor 52 may be formed together as a system-on-chip (SoC) or may be individual, separate integrated circuits. In some examples, controller 50 may be formed in the same integrated circuit as multimedia processor 52. Multimedia processor 52 may include fixed-function circuitry, programmable circuitry, or a combination of fixed-function and programmable circuitry. Multimedia processor 52 may include one or more processors, such as one or more microprocessors, application specific integrated circuits (ASICs), field programmable gate arrays (FPGAs), digital signal processors (DSPs), or other equivalent integrated circuits or discrete logic circuits.

The example techniques described in this disclosure are described with respect to controller 50 and/or multimedia processor 52. Controller 50 and/or multimedia processor 52 are examples of processing circuitry that is configured to perform the example techniques described in this disclosure.

Pose buffer 72 may be part of local memory (e.g., cache) of multimedia processor 52. In some examples, pose buffer 72 may be part of the system memory of wearable display device 16, such as in examples where pose buffer 72 is external to multimedia processor 52. Pose buffer 72 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

As illustrated, bitstream parser circuit 64 receives a bitstream that includes image content information for frame n. In this example, frame n includes three slices 1-3. Also, assume that the image content information for slice 2 is dropped or corrupted.

The bitstream may be packetized and includes image content information for each slice, where the image content information indicates the manner in which the slices are to be reconstructed. The packetized information may include header information, which may be some auxiliary data, that indicates to which slice the image content information belongs. Bitstream parser circuit 64 may depacketize the information, read the headers, and form an output bitstream of image content information that decoder circuit 66 can process. As part of the reading of the headers or depacketizing, bitstream parser circuit 64 may output information indicating portions of frame n for which multimedia processor 52 did not receive image content information to controller 50.

For instance, in FIG. 3, bitstream parser circuit 64 may determine, based on the header information, that image content information for slice 1 is included in the bitstream. Then, bitstream parser circuit 64 may determine, based on the header information, that image content information for slice 3 is included in the bitstream. Because there was no header information for slice 2, bitstream parser circuit 64 may determine that information for slice 2 is not in the bitstream because it did not parse any header information indicating that image content information is for slice 2.

As another example, bitstream parser circuit 64 may output information to controller 50 indicating the slice for which bitstream parser circuit 64 received image content information. Controller 50 may then track for which portions of frame n multimedia processor 52 received image content information. There may be other ways in which to determine for which portions of frame n multimedia processor 52 received image content information.

Based on information received from bitstream parser circuit 64, controller 50 may generate a mask for the current frame based on the determined portions of the current frame for which image content information was lost (e.g., portions of current frame for which image content information was not received, not included in the bitstream, or corrupted). The mask indicates portions (e.g., slices) of the current frame for which image content information was received (e.g., logic zeros in the mask are associated with portions for which image content information was received), and portions of the current frame for which image content information was lost (e.g., logic ones in the mask are associated with portions for which image content information was not received).

Decoder circuit 66 may receive the image content information from bitstream parser circuit 64, and reconstruct the current frame (e.g., frame n). In some examples, the image content information includes information such as motion vectors for blocks within portions of frame n and reference pictures, where a motion vector refers to a predictive block in a reference picture. A reference picture is a previously decoded picture that is stored in DFB 68. For example, as illustrated DFB 68 includes frame n−1, which is a previously decoded frame.

Frame n−1 need not be the frame that is displayed immediately before frame n, but may be a frame that is displayed immediately before frame n. Frame n−1 need not be the frame that is decoded immediately before frame n, but may be a frame that is decoded immediately before frame n. Although this disclosure refers to the previous frame as frame n−1, the previous frame need not be the immediately preceding frame in decoding or display order, and may be any frame stored in DFB 68.

The output of decoder circuit 66 is partial frame n 74. Frame n 74 may be a partial frame because frame n 74 includes portions that are erroneous. For instance, because there was no image content information for slice 2, image content for slice 2 may not be present in frame n 74. In some examples, decoder circuit 66 may perform some level of error concealment, such as by copying image content from frame n−1 that corresponds to the portion in frame n for which image content information was not received to generate partial frame n 74. However, such error concealment techniques may not be sufficient because they fail to account for pose information.

In the techniques described in this disclosure, bitstream parser circuit 64 may also determine the pose information of frame n, which may be part of the header information of frame n. The pose information may be the pitch, roll, yaw of perspective from which frame n was generated by host device 10. Controller 50 may receive the pose information for frame n from bitstream parser circuit 64, and store the pose information in pose buffer 72. Alternatively or additionally, bitstream parser circuit 64 may store the pose information in pose buffer 72, and controller 50 retrieves the pose information from pose buffer 72.

Pose buffer 72 stores pose information of frames that are processed by multimedia processor 52. For example, for each frame, pose buffer 72 may store the pose information associated with that frame. As another example, in some examples, bitstream parser circuit 64 may receive timestamps for frames, and pose buffer 72 may store the pose information associated with a timestamp. In such examples, the timestamp points to an entry in pose buffer 72. There may be other ways in which pose buffer 72 stores pose information that is associated with the frames.

Controller 50 receives the pose information for frame n−1 (e.g., pose n−1 of FIG. 3) and pose information for frame n, and generates a homography based on the pose information. In the homography, controller 50 determines a transformation of where image content from frame n−1 would appear in the field-of-view from which frame n was generated. For example, controller 50 may determine a difference in the pose information between frame n and frame n−1 (e.g., difference in pose n and pose n−1), and generates a projection matrix that GPU 70 uses to re-project frame n−1 to a view appropriate for time n, as described above with respect to the homography.

GPU 70 executes a vertex shader that transforms vertex coordinates of primitives in frame n−1 based on the projection matrix (e.g., multiplies coordinates with the projection matrix) to generate projected vertex coordinates. GPU 70 includes a texture circuit that maps pixels from frame n−1 to a frame mesh based on the coordinates in frame n−1 and the projected coordinates. GPU 70 may also execute fragment shaders (also called pixel shaders) to shade in (e.g., fill in) the image content in the frame mesh. The mapping of pixels to the mesh, and filling in the image content with fragment shaders is referred to as texture rendering.

As an illustrative example, assume that a primitive in frame n−1 has the following vertex coordinates: (x1, y1, 1), (x2, y2, 1), and (x3, y3, 1). After the vertex shader multiplies the coordinates with the projection matrix (also called rotation matrix), the projected coordinates may be (x1', y1', 1), (x2', y2', 1), and (x3', y3', 1). In this example, the texture circuit may stretch, shrink, rotate, or otherwise modify the image content with the primitive defined by the vertices (x1, y1, 1), (x2, y2, 1), and (x3, y3, 1) so that the image content fits within the primitive on the frame mesh defined by the vertices (x1', y1', 1), (x2', y2', 1), and (x3', y3', 1). In the stretching, shrinking, rotating, or modifying, GPU 70 may execute one or more instantiations of fragment shaders to determine the color values of pixels within the primitive defined by the vertices (x1', y1', 1), (x2', y2', 1), and (x3', y3', 1).

In some examples, GPU 70 may perform such operations for each primitive in frame n−1 to generate a warped frame. In some examples, GPU 70 may perform such operations only for primitives in frame n−1 that correspond to portions of frame n for which image content information was not received (e.g., as indicated by the generated mask). In this way, GPU 70 may generate warped image content based on the pose information of a current frame (e.g., frame n) and a previous frame (e.g., frame n−1).

The example warping performed by GPU 70 described above is ATW. In some examples, multimedia processor 52 may include a depth buffer that stores depth information (e.g., a depth map) for pixels or portions in each of the frames. The depth information indicates how far back or in front the image content is to appear to a viewer. Controller 50 may use the depth information along with the difference in the pose information to generate the projection matrix that GPU 70 uses for generating the projected vertex coordinates. For ATW with depth, the texture rendering operations may be similar to those described above for ATW.

In some examples, such as if frame n and frame n−1 are separated by relatively large amount of time, it may be possible that there are portions in the warped image content for which the texture circuit did not map any image content. This may be because there was no vertex in frame n−1 that when multiplied by the projection matrix resulted in there being a vertex in a particular portion of the warped image content. Because there is no vertex in this portion of the warped image content, GPU 70 may not render any image content to that portion resulting in blank space in the warped image content.

To address this, in some examples, multimedia processor 52 may receive from host device 10 image content for a larger field of view (FOV) than the FOV of frame n−1. For example, assume that frame n−1 encompasses a rectangular area of image content. Host device 10 may transmit image content information for a larger rectangular area than the rectangular area encompassed by frame n−1. This additional image content may not be visible when frame n−1 is displayed. However, this additional image content may be used when the texture circuit performs the texture rendering. For instance, the texture circuit may warp not only the image content in frame n−1 but the image content in larger FOV to generate the warped image content.

Transmitting of the additional FOV may be based on the latency between the host device 10 and wearable display device 16. For example, if there is high latency, then host device 10 may increase the FOV of frame to ensure there is image content available from the previous frame for the warping as the amount of warping needed may be greater since the viewer may change pose by a relatively large amount. If there is low latency, then host device 10 may decrease or leave unchanged the FOV of frames as the amount of warping needed may not be great since the viewer may not change pose by a large amount.

GPU 70 may blend the image content from partial frame n 74 with the warped image content to generate error concealed frame n 76. As one example, for portions of frame n for which multimedia processor 52 did not receive any image content information, GPU 70 may copy image content information from the warped image content and replace any image content that may be in the portion with the copied image content.

As another example, controller 50 or GPU 70 may smooth the generated mask. For example, the mask may include zeros and ones, where zero is associated with portions of frame n for which image content information was received, and one is associated with portions of frame n for which image content information was not received. In some examples, controller 50 and/or GPU 70 may perform a weighted average such that rather than having a jump from a zero in the mask to a one in the mask or vice-versa from one to zero, the values are slowly ramped from a zero to a one and vice-versa from one to zero. For example, along the border of where the mask values change from zero to one, the values may be smoothed so that the transition from zero to one is gradual (e.g., the values are changed to 0.1, 0.2, 0.3, and so forth to 1).

These values may then represent the blend factors. For example, GPU 70 may read the smoothed mask value and perform blending based on the mask value. As an example, if a mask value is 0.4, then GPU 70 may use 40% of the color value of the pixel in partial frame n 74 and 60% of the color value of the corresponding pixel in the warped image content to generate a blended color value.

The output of the blending operation from GPU 70 is error concealed frame n 76. Frame n 76 is error concealed because portions of frame n for which multimedia processor 52 did not receive image content is concealed with portions from the warped image content. In some cases, any concealment performed by decoder circuit 66 is overwritten by GPU 70 in the blending. Display screens 54 may display image content based on error concealed frame n 76.

In some examples, GPU 70 may output error concealed frame n 76 to DFB 68, and error concealed frame n 76 may form as a reference frame for a subsequent frame to be decoded. However, storage of error concealed frame n 76 in DFB 68 is not necessary in all examples.

Controller 50 and/or GPU 70 may be configured, in some examples, to determine a quality of concealment in error concealed frame n 76. For instance, controller 50 and/or GPU 70 may determine whether there are any sudden changes in color values along the border of the portions of partial frame n 74 for which GPU 70 performed error concealment. Controller 50 and/or GPU 70 may determine a difference in the color values along the border, and if the difference is greater than a threshold, may determine that there is a sudden change in color values. If there are sudden changes, controller 50 and/or GPU 70 may transmit information to host device 10 indicating that frame n or the error concealed frame n 76 or portions of frame n or portions of error concealed frame n 76 should not be predictive portions (e.g., portions for which GPU 70 performed error concealment should not be used to inter-predict portions of subsequent frames).

In some examples, prior to display, GPU 70 may perform additional warping to account for the current pose of wearable display device 16. For instance, the current orientation/position of wearable display device 16 may be different from its orientation/position when wearable display device 16 requested for image content for frame n. For instance, the rendering duration of frame n and generation of error concealed frame n 76 is non-zero, and complex scenes may reduce the rendering frames-per-second (fps) rate to below the display fps rate. If the rendering rate becomes too low, or if the head motion or object motion is fast, the result may be judder or stutter.

GPU 70 may perform additional warping to address the possible judder or stutter that may occur. For instance, if error concealed frame n 76 were displayed, there may be judder because the pose of wearable display device 16 may have changed. Accordingly, GPU 70 may perform additional warping on error concealed frame n 76 to account for the change in pose of wearable display device 16. For example, GPU 70 may perform ATW, ATW with depth, ASW, or ASW with depth on error concealed frame n 76 to correct for evolution of head position and scene motion from when GPU 70 generated error concealed frame n 76. Performing warping on error concealed frame n 76 may potentially provide good quality VR with simpler computing hardware, lower rendering fps, and lower latency. GPU 70 may generate a final frame based on the additional warping, and display screens 54 may display image content based on the final frame.

FIG. 4 is a block diagram illustrating another example of the multimedia processor of FIG. 2 in greater detail. FIG. 4 is substantially similar to FIG. 3, and circuits having same reference numerals operate in the same manner or substantially the same manner.

FIG. 3 illustrated the example operation of multimedia processor 52 with respect to ATW or ATW with depth in generating the warped image content. FIG. 4 illustrates the example operation of multimedia processor 52 with respect to ASW or ASW with depth in generating the warped image content.

As illustrated, multimedia processor 52 includes motion vector buffer 78, which may be similar to pose buffer 72 and DFB 68. However, motion vector buffer 78 stores motion vector information for frames that multimedia processor 52 processes.

In FIG. 4, bitstream parser circuit 64 unpacks from the bitstream the motion vectors, and forwards them to controller 50. The motion vectors may be part of the auxiliary data that bitstream parser circuit 64 transmits to controller 50. In some cases, the motion vectors should indicate correspondences between two rendered frames, and could be generated by high end GPU on host device 10. In some examples, rather than bitstream parser circuit 64, decoder circuit 66 may output the motion vectors.

Controller 50 may be configured to warp vectors based on the pose information of frame n and frame n−1, and available motion vectors of frame n. For instance, motion vectors of frame n point to reference blocks in frame n−1. Controller 50 may determine the extrapolated 3D position of blocks in frame n based on motion vectors sent in frame n, pose n−1, and pose n−2. Use of motion vectors is described in more detail with respect to FIG. 6.

Figure 5:
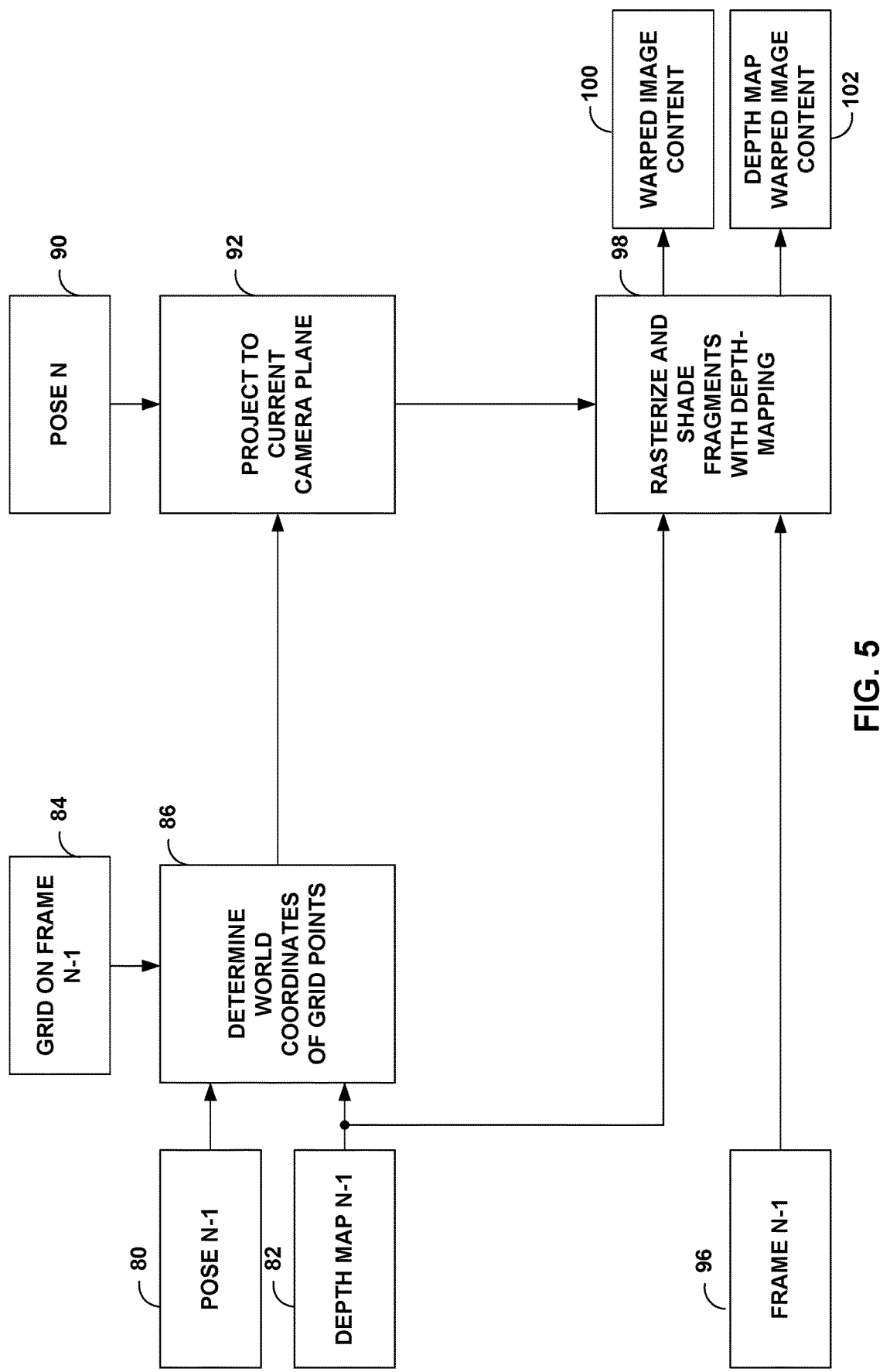
FIG. 5 is a process diagram illustrating an example of time warping with depth.

FIG. 5 is a process diagram illustrating an example of time warping with depth. For instance, FIG. 5 illustrates ATW and ATW with depth similar to the above description. Controller 50 receives eye pose information from sensing circuit 20 for frame n−1 (80), and depth map for frame n−1 from host device 10 (82). In addition, controller 50 may generate a grid on frame n−1 (84). The grid on frame n−1 may be frame n−1 divided into rectangles.

Controller 50 assigns each point on the grid an (x, y, z) coordinate (86), and the result is a grid with (x, y, z) coordinates. In some examples, such as ATW with depth, controller 50 may assign z coordinates to points on the grid based on the depth map for frame n−1. The x and y coordinates may be the x and y coordinates starting from the top-left corner of frame n−1 having x-coordinate of 0 and y-coordinate of 0. In some examples, controller 50 and/or multimedia processor 52 may generate x, y, z world coordinates of frame n−1 using depth map and focal length as described in more detail below.

Controller 50 receives the pose information for frame n (90), and based on (x, y, z) coordinates from the grid of frame n−1 generates a projection matrix for where the pixels in the grid will be visible in the perspective of frame n (92). The result of this operation may be a grid on current frame (e.g., frame n). For instance, in some examples, controller 50 may perform the multiplication between the projection matrix and the coordinates on the grid. In other examples, GPU 70 may perform the multiplication.

GPU 70 may then rasterize and shade fragments with appropriate depth-mapping (98). For example, GPU 70 may receive frame n−1 (96), and may texture map frame n−1 to the grid on frame n, and perform rasterizing and shading (98) to generate the warped image content (100) and the depth map for the warped image content (102). The depth map of the warped image content is the z-coordinate determined as part of the warping. GPU 70 may then use the warped image content for error concealment in accordance with the examples described above. The depth map of the warped image content may be then used to substitute the depth information of the current frame for which image content information was not received.

The following provides an example of how depth is used for warp, such as the manner in which to find world coordinates of grid points. Assume that there is a plurality of objects viewable from a vantage point $p_n$. However, not the entirety of the objects may be viewable (e.g., the back of the object is occluded by the front of the object), or one object may occlude another object. Accordingly, on an image plane, with an image width W, a subset of the objects is viewable.

The image plane is a focal length away from the hypothetical camera capturing the image content. For example, an actual camera is not needed for various graphics application; however, a focal length may still be a valid measure. A focal length may be indicative of where a hypothetical camera capturing the image content is located even though there is no actual camera. The hypothetical camera may be considered as the vantage point of the viewer. The focal length is set by host device 10 to set how far or close image content should appear. In addition, controller 50 and/or host device 10 may generate a depth map that indicates the depth of each of the objects.

Host device 10 may transmit the focal length and/or the depth map. Based on the focal length and depth map, controller 50 may determine the x and y coordinates for the objects to be rendered relative to the camera. For example, let $f_n$ be a rendered image at time n. The pixels in this image are obtained by projecting surfaces of objects visible from the vantage point (e.g., camera position) $p_n$ on the image plane. Each pixel in the image corresponds to a point on a visible surface, and has an (x, y) coordinate on the image plane, which is two-dimensional.

For a depth map, $d_n$ for $f_n$, as received from host device 10, then for a pixel (x, y) on the image plane, there is a depth value z', which is received from the depth map. The depth map stores a z' value for (x, y) pixels on the image plane.

The corresponding 3D coordinate relative to camera is x'=x*z'/F, y'=y*z'/F, where the focal length F equals W/(2*tan(FOV)/2)), where W is the width of the image in pixels, and field of view (FOV) is the horizontal FOV and is an angular measure of how much image content in a 360-degree space is captured.

For a camera pose $p_n=(x_n, y_n, z_n, q_n)$, the world coordinates of the pixel is $$\begin{bmatrix} x'' \\ y'' \\ z'' \end{bmatrix} = \begin{bmatrix} xn \\ yn \\ zn \end{bmatrix} + R(qn) * \begin{bmatrix} x' \\ y' \\ z' \end{bmatrix},$$

R(qn) is a rotation matrix that aligns the camera coordinate system with the world coordinate system. Once the world coordinates of pixels are determined, GPU 70 may project them (e.g., texture map) to a different image plane corresponding to a new camera pose $p_{n+1}$ to determine where they should lie in that image plane.

For example, controller 50 or multimedia processor 52 may determine the world coordinates for the pixels in the frame n-1 (e.g., previous frame) using the above example techniques based on the depth map of frame n-1. Once controller 50 and/or multimedia processor 52 determine the world coordinates for pixel in frame n-1, GPU 70 may perform texture mapping using the world coordinates for pixel in frame n-1 and the current pose of wearable display device 16 to generate world coordinates for pixel in the warped frame. In this manner, multimedia processor 52 may generate the warped frame using depth map.

Figure 6:
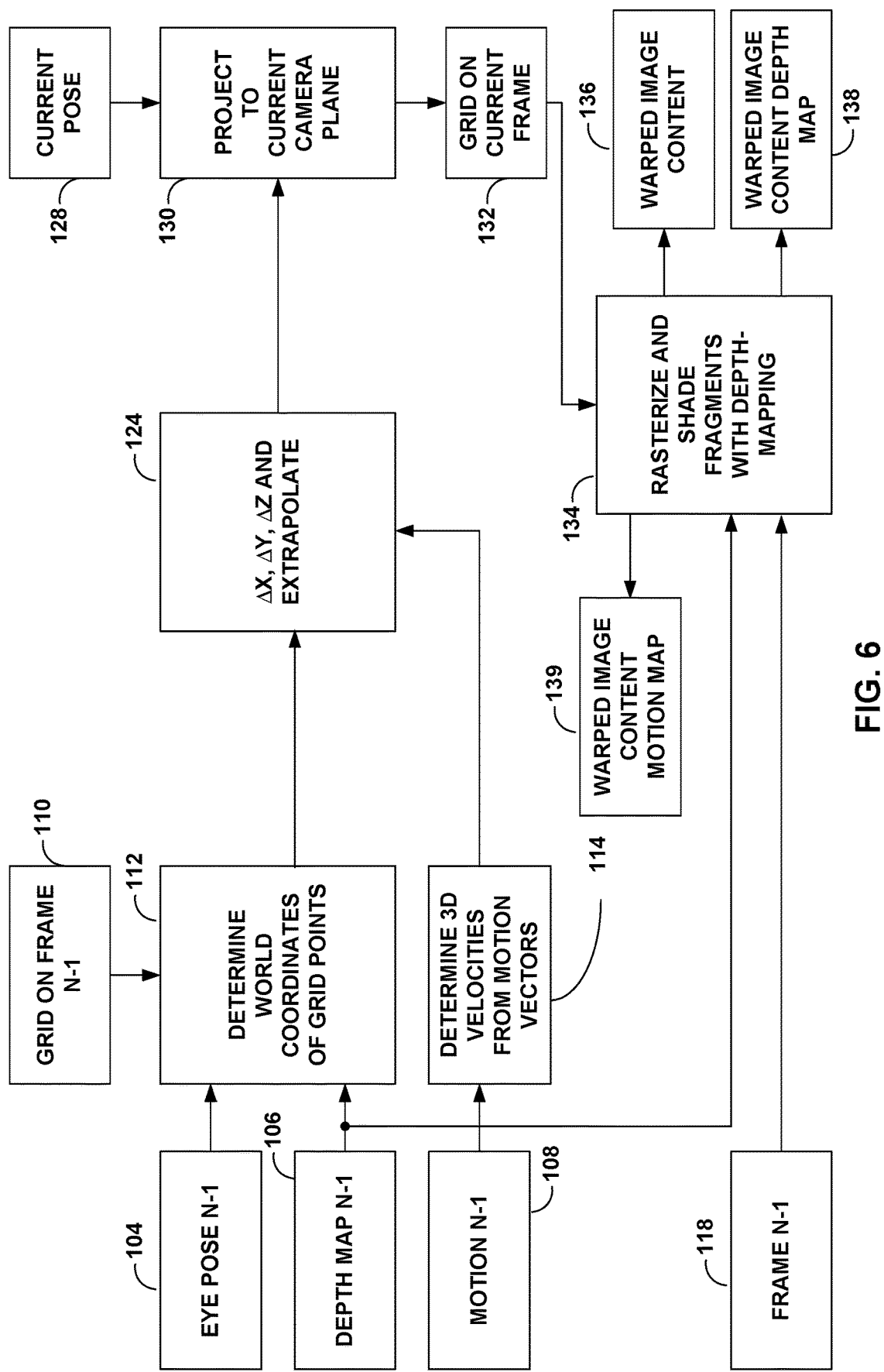
FIG. 6 is a process diagram illustrating an example of space warping with depth.

FIG. 6 is a process diagram illustrating an example of space warping with depth. The process illustrated in FIG. 6 may be similar to that illustrated in FIG. 5. However, motion vectors from frames may also be used to warp image content of frame n-1.

Space warping accounts the movement of the objects in addition to changes in the pose of wearable display device 16. For instance, in ATW and ATW with depth, the warping is performed based on changes in the position of wearable display device 16 but the movement of objects is not accounted for. Space warping accounts for velocities at which objects may be moving, which is based on motion vectors. For example, if a block in the current frame has a large motion vector (e.g., relatively large x and y values for the motion vector), then the movement of the object may be relatively fast. If a block in the current frame has a small motion vector (e.g., relatively small x and y values for the motion vector), then the movement of the object may be relatively slow.

In FIG. 6, similar to FIG. 5, controller 50 receives eye pose information from sensing circuit 20 for frame n-1 (104), and depth map for frame n-1 from host device 10 (106). In addition, controller 50 may generate a grid on frame n-1 (110). The grid on frame n-1 may be frame n-1 divided into rectangles. Controller 50 and/or multimedia processor 52 may determine world coordinates on grid points (112) using the techniques described above based on focal length and depth map.

For space warping, controller 50 may determine a motion map for frame n-1 (108). The motion map indicates the motion vectors for blocks in frame n-1. From the motion vectors, controller 50 and/or multimedia processor 52 may determine 3D velocities (114).

The 3D velocities $v_x$, $v_y$, $v_z$ may not be directly specified, but motion vectors for the frame n-1 are available, where motion vectors in frame n-1 point to blocks in earlier frames (e.g., frame n-2). As an example to determine the velocities, assume that pixel (x, y) in frame n-1 corresponds to (a, b) in frame n-2 based on motion vectors. Based on the depth maps and pose information for frame n-1 and frame n-2, controller 50 and/or multimedia processor 52 may determine the world coordinates using the above techniques as (x", y", z") for frame n-1 and (a", b", c") for frame n-2. The 3D velocity may be calculated as follows:

$$\begin{bmatrix} vx \\ vy \\ vz \end{bmatrix} = \left( \begin{bmatrix} x'' \\ y'' \\ z'' \end{bmatrix} - \begin{bmatrix} a'' \\ b'' \\ c'' \end{bmatrix} \right) / t,$$

where t is time difference between consecutive frames (e.g., frame n-1 to frame n-2).

With the velocities, controller 50 and/or multimedia processor 52 may extrapolate the x, y, z coordinates in the world space. The world coordinate of the pixel when the camera assumes pose $p_n$ is $$\begin{bmatrix} x'' + vx * t \\ y'' + vy * t \\ z'' + vz * t \end{bmatrix}.$$

Once the world coordinates of pixels are determined, GPU 70 may project them (e.g., texture map) to a different image plane corresponding to a camera pose $p_n$ to determine where they should lie in that image plane (i.e., image plane of frame n). The projection operation may involve the rotation matrix $R(q_n)$ that rotates the world coordinate system to the camera coordinate system (e.g., ΔX, ΔY, ΔZ extrapolated (124))

Controller 50 receives the pose information for frame n (128), and based on (x, y, z) coordinates from the grid of frame n-1 generates a projection matrix for where the pixels in the grid will be visible in the perspective of frame n (e.g., camera plane) (130). The result of this operation may be a grid on current frame (e.g., frame n) (132). For instance, in some examples, controller 50 may perform the multiplication between the projection matrix and the coordinates on the grid. In other examples, GPU 70 may perform the multiplication.

GPU 70 may then rasterize and shade fragments with appropriate depth-mapping (134). For example, GPU 70 may receive frame n-1 (118), and may texture map frame n-1 to the grid on frame n, and perform rasterizing and shading to generate the warped image content (136), the depth map for the warped image content (138), and warped image content motion map (139). The depth map of the warped image content is the z-coordinate determined as part of the warping, and the warped image content motion map is the motion map for the warped image content. GPU 70 may then use the warped image content for error concealment in accordance with the examples described above. The depth map and motion map of the warped image content may be then used to substitute the depth information and motion map of the current frame for which image content information was not received.

Figure 7:
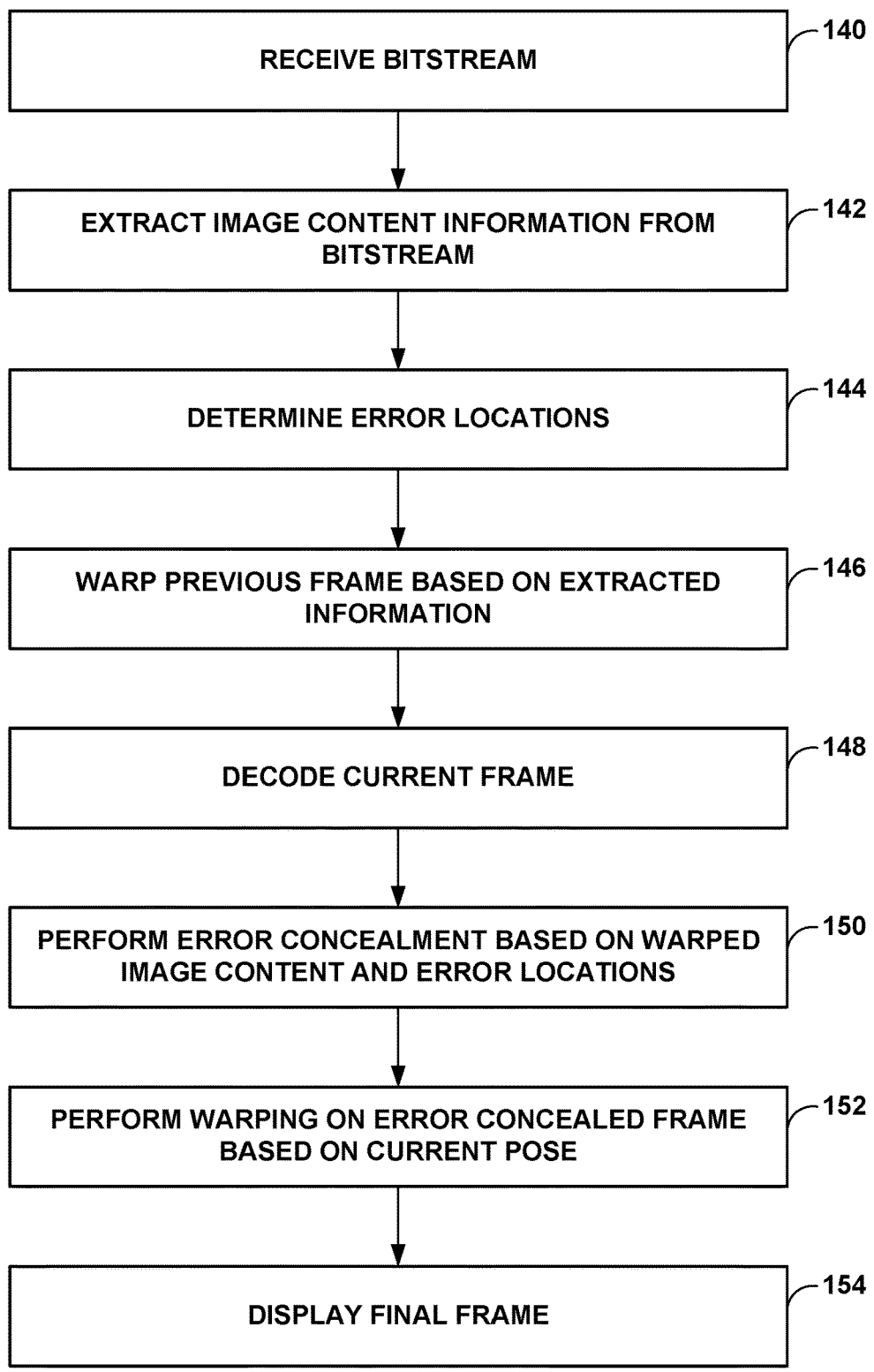
FIG. 7 is a flowchart illustrating an example method of image processing in accordance with one or more examples described in this disclosure.

FIG. 7 is a flowchart illustrating an example method of image processing in accordance with one or more examples described in this disclosure. Although FIG. 7 illustrates an ordered list of operations, the techniques described in this disclosure need not necessarily operate in the illustrated order. Various operations may occur in parallel or in a different sequence than illustrated.

Also, the example techniques described in FIG. 7 may be performed by multimedia processor 52 and/or controller 50. Multimedia processor 52 and/or controller 50 are examples of processing circuitry (e.g., fixed-function, programmable, or combination).

Bitstream parser circuit 64 receives a bitstream from host device 10 (140). The bitstream includes image content information for reconstructing a current frame. Bitstream parser circuit 64 may extract image content information from the bitstream (142). For example, bitstream parser circuit 64 may extract information indicating for which portions of the current frame image content information was received. Bitstream parser circuit 64 may also extract information indicative of the pose information associated with the current frame. In some examples, bitstream parser circuit 64 may extract information such as motion vectors for blocks in the current frame, and depth map for the current frame. Bitstream parser circuit 64 may output the extracted information to controller 50.

Controller 50 may determine error locations in the current frame based on the extracted information (144). Error locations refer to portions of the current frame for which bitstream parser circuit 64 did not receive image content information. Accordingly, controller 50 may determine, based on the received bitstream, portions of the current frame for which content information was lost (e.g., dropped, not received, or corrupted). Controller 50 may generate a mask for the current frame based on the determined portions of the current frame for which image content information was lost, where the mask indicates portions of the current frame for which image content information was received in the bitstream, and the portions of the current frame for which image content information was lost.

GPU 70 may be configured to warp image content of a previous frame based on extracted information such as pose information of wearable display device 16 when wearable display device 16 requested image content information of the previous frame (i.e., pose information of the previous frame) and pose information of wearable display device 16 when wearable display device 16 requested image content information of the current frame (i.e., pose information of the current frame) to generate warped image content (146). For example, controller 50 may determine a projection matrix based on the pose information of the current and previous frames. In some examples, controller 50 may determine the projection matrix using additional information such as motion vectors and depth maps extracted from the bitstream.

Controller 50 may output the projection matrix to GPU 70. GPU 70 in turn may use the projection matrix to generate projection vertices for the warped image content using vertex shaders. GPU 70 may then perform texturing when the previous frame forming as the texture, the vertices of the previous frame as forming the source vertices, and the projected vertices forming the destination vertices. The result of the texture rendering is the warped image content. Examples of the warping include applying asynchronous time warp (ATW), applying ATW with depth, applying asynchronous space warp (ASW), or applying ASW with depth.

Decoder circuit 66 may receive extracted information from bitstream parser circuit 64, and decode the image content to reconstruct a partial current frame (148). For example, decoder circuit 66 may use motion vectors and previously decoded frames in DFB 68 to generate a partial current frame. The current frame may only be partially reconstructed because there are portions of the current frame for which there was no image content information that was received. Decoder circuit 66 may apply some amount of error concealment but such error concealment may be insufficient.

GPU 70 may perform error concealment based on the warped image content and error locations (150). For example, GPU 70 may blend the image content from the warped image content with the image content of the current frame to generate an error concealed frame. As one example, GPU 70 may copy image content from the warped image content into the determined portions of the current frame for which image content information was lost. As another example, GPU 70 may output image content for the current frame for portions of the current frame for which image content was received in the bitstream as indicated by the mask generated by controller 50. GPU 70 may blend image content from the warped image content for portions of the current frame for which image content was lost as indicated by the mask generated by controller 50. For instance, GPU 70 may copy image content from the warped image content, or GPU 70 may weigh image content from the current frame and from the warped image content and blend the image content based on the weighting. As an example, GPU 70 may blend color values of pixels in the current frame and color values of pixels from the warped image content based on the mask generated by controller 50.

The result of the blending is the error concealed frame. GPU 70 and/or controller 50 may determine the quality of the error concealment based on whether there is any sudden change in the color values along the border of reconstructed current frame and portions substituted or blended from the warped image content. Wearable display device 16 may transmit information indicating that the current frame or the error concealed frame should not be a predictive frame (e.g., reference frame) for subsequent frames, or portions of the current frame or portions of the error concealed frame should not be predictive portions based on the determined quality of error concealment.

In some examples, display screens 54 may display image content based on the error concealed frame. However, in some examples, there may be additional processing of the error concealed frame.

GPU 70 may perform warping on the error concealed frame based on the current pose information (152). For example, by the end of generating the error concealed frame, the position of wearable display device 16 may have changed. GPU 70 may apply any one of asynchronous time warp (ATW), applying ATW with depth, applying asynchronous space warp (ASW), or applying ASW with depth on the error concealed frame based on the current pose information to generate the final frame. Display image content based on the error concealed frame includes displaying image content based on final frame (154).

In the above examples, multimedia processor 52 performed operations for error concealment. However, in some examples, host device 10 may be configured to drop from processing portions of the current frame if host device 10 determines that the error concealment is of sufficient quality that multimedia processor 52 can generate an error concealed frame that is approximately the same as the current frame. For example, the bitstream that multimedia processor 52 receives includes image content information for a first portion of the current frame and not for a second portion of the current frame based on a determination by host device 10 (e.g., a server) that transmits the bitstream of error concealment capabilities of wearable display device 16 that receives the bitstream.

In such examples, host device 10 may transmit information indicating portions of the current frame for which not image content information was generated, as well as information indicating a manner which to warp the image content (e.g., ATW, ATW with depth, ASW, or ASW with depth). Controller 50, based on information extracted from the bitstream, may determine a manner in which to warp image content of the previous frame based on information received in the bitstream. GPU 70 may warp the image content of the previous frame based on the determined manner.

Figure 8:
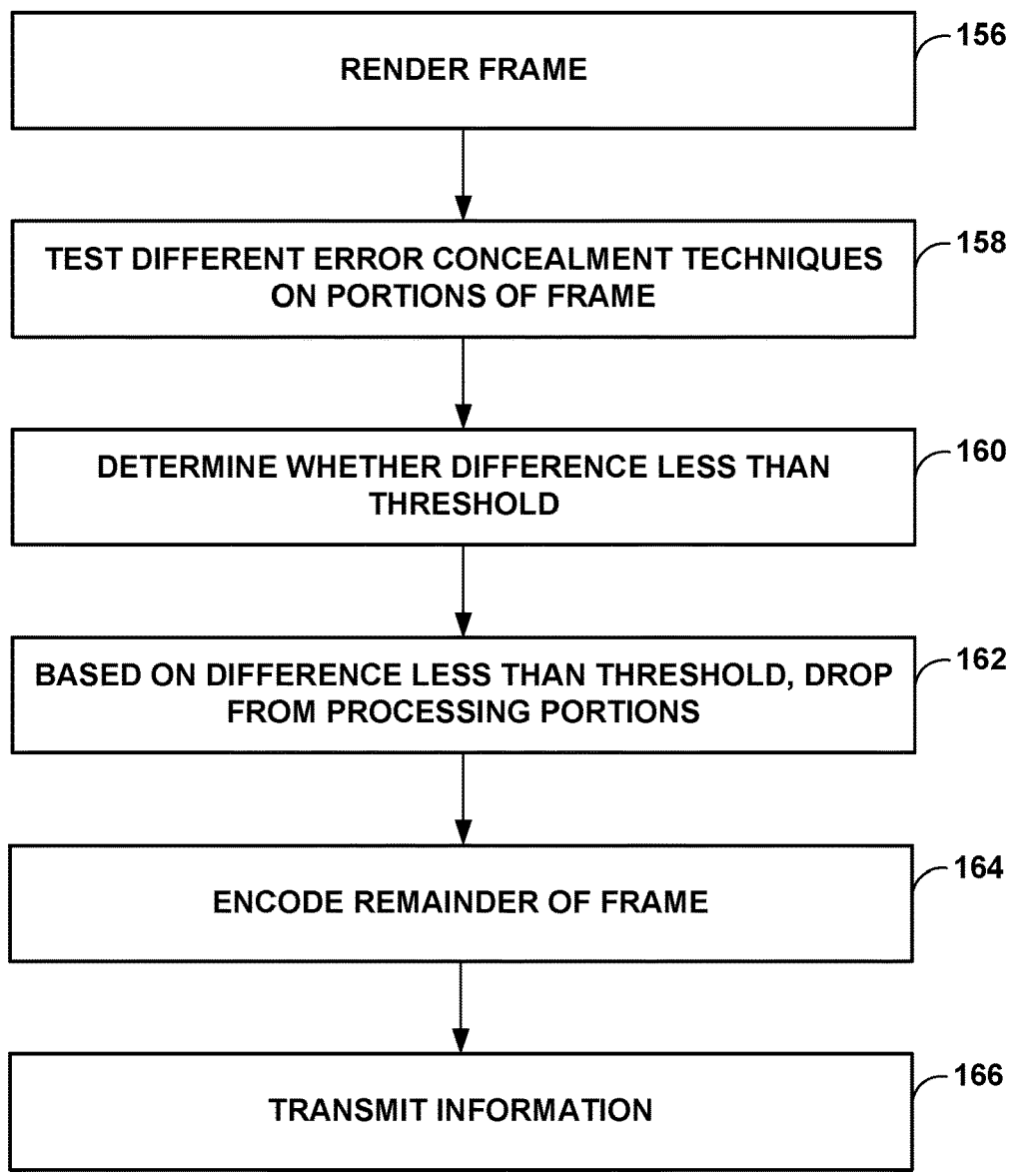
FIG. 8 is a flowchart illustrating an example method of generating image content in accordance with one or more examples described in this disclosure.

FIG. 8 is a flowchart illustrating an example method of generating image content in accordance with one or more examples described in this disclosure. For example, host device 10 may render a current frame (156). Host device 10 may receive pose information from wearable display device 16, and based on the pose information use the high end GPU to render a frame.

Host device 10 may test different error concealment techniques on portions of the current frame (158). For example, host device 10 may perform warping, same as the techniques described with respect to multimedia processor 52 and controller 50, using a previous frame to generate warped image content, and replace the portion of the current frame with the warped image content. Host device 10 may use different warping techniques to generate different warped image content.

For each of the warped image content, host device 10 may determine whether a difference in the actual image content of the current frame and the warped image content is less than a threshold (160). Based on the difference being less than the threshold, host device 10 may drop, from processing, portions of the current frame (162). For example, host device 10 may determine that it is sufficient for wearable display device 16 to receive a bitstream that includes image content information for a first portion of the current frame and not for a second portion of the current frame. Host device 10 may reach this determination based on determining that error concealment capabilities of wearable display device 16 are sufficient to approximate the actual image content of the current frame with warped image content.

Host device 10 may encode the remainder of the frame (164). For example, host device 10 may include an encoder circuit that performs the reciprocal operations as decoder circuit 66. The encoder circuit may use video encoding techniques to encode the portions of the frame that host device 10 did not drop from further processing.

Host device 10 may transmit information (e.g., in form of a bitstream) to wearable display device 16 (166). As one example, host device 10 may transmit information such as portions of the current frame for which image content information was not generated, as well as information indicating the warping technique that should be use to conceal the portions of the current frame for which image content information was not generated. In such examples, controller 50 may determine a manner in which to warp the image content of the previous frame based on information received in a bitstream. Controller 50 and GPU 70 may warp the image content of the previous frame based on the determined manner.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. In some examples, computer-readable media may comprise non-transitory computer-readable media. Data storage media may be any available media that can be accessed by one or more computers or one or more processors to retrieve instructions, code and/or data structures for implementation of the techniques described in this disclosure.

By way of example, and not limitation, such computer-readable media can comprise non-transitory media such as RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the aspects have been described. These and other aspects are within the scope of the following claims.

What is claimed is:

1. A method of image processing, the method comprising:
    determining, based on a received bitstream, one or more slices of a current frame for which image content information was lost;
    receiving image content of a different field of view (FOV) than a FOV of a previous frame;
    warping image content of the different FOV and the previous frame based on pose information of a device when the device requested image content information of the previous frame and pose information of the device when the device requested image content information of the current frame to generate warped image content;
    blending image content from the warped image content with image content of the current frame based on the determined one or more slices of the current frame for which image content information was lost to generate an error concealed frame; and
    displaying image content based on the error concealed frame.

2. The method of claim 1, further comprising:
    generating a mask for the current frame based on the determined one or more slices of the current frame for which image content information was lost, the mask indicating one or more slices of the current frame for which image content information was received in the bitstream, and the one or more slices of the current frame for which image content information was lost,
    wherein blending the image content comprises:
        outputting image content from the current frame for one or more slices of the current frame for which image content was received in the bitstream as indicated in the generated mask; and
        blending image content from the warped image content for one or more slices of the current frame for which image content was lost as indicated in the generated mask.

3. The method of claim 2, wherein generating the mask comprises:
    warping a previous mask based on the pose information of the device when the device requested image content information of the previous frame and the pose information of the device when the device requested image content information of the current frame to generate a warped mask, wherein the previous mask indicates one or more slices of one or more previous frames for which image content information was lost; and
    generating the mask for the current frame based on the determined one or more slices of the current frame for which image content information was lost and the warped previous mask.

4. The method of claim 2, wherein blending image content from the warped image content comprises blending color values of pixels from the current frame and color values of pixels from the warped image content based on the generated mask.

5. The method of claim 1, further comprising determining a manner in which to warp the image content of the previous frame based on information received in a bitstream, and wherein warping the image content of the previous frame comprises warping the image content of the previous frame based on the determined manner.

6. The method of claim 1, further comprising receiving a bitstream including image content information for a first portion of the current frame and not for a second portion of the current frame based on a determination by a server, that transmits the bitstream, of error concealment capabilities of the device receiving the bitstream.

7. The method of claim 1, further comprising:
    warping the image content of the error concealed frame based on current pose information of the device to generate a final frame,
    wherein displaying image content comprises displaying image content based on the final frame.

8. The method of claim 1, wherein warping comprises one of applying asynchronous time warp (ATW), applying ATW with depth, applying asynchronous space warp (ASW), or applying ASW with depth.

9. The method of claim 1, further comprising:
    determining a quality of error concealment in the error concealed frame; and
    transmitting information indicating that the current frame or the error concealed frame should not be a predictive frame, or one or more slices of the current frame or one or more slices of the error concealed frame should not be predictive one or more slices based on the determined quality of error concealment.

10. A device for image processing, the device comprising:
    processing circuitry configured to:
        determine, based on a received bitstream, one or more slices of a current frame for which image content information was lost,
        receive image content of a different field of view (FOV) than a FOV of a previous frame,
        warp image content of the different FOV and the previous frame based on pose information of a device when the device requested image content information of the previous frame and pose information of the device when the device requested image content information of the current frame to generate warped image content; and
        blend image content from the warped image content with image content of the current frame based the determined one or more slices of the current frame for which image content information was lost to generate an error concealed frame; and
    a display screen configured to display image content based on the error concealed frame.

11. The device of claim 10, wherein the processing circuitry is configured to:
    generate a mask for the current frame based on the determined one or more slices of the current frame for which image content information was lost, the mask indicating one or more slices of the current frame for which image content information was received in the bitstream, and the one or more slices of the current frame for which image content information was lost,
    wherein to blend the image content, the processing circuitry is configured to:
        output image content from the current frame for one or more slices of the current frame for which image content was received in the bitstream as indicated in the generated mask; and blend image content from the warped image content for one or more slices of the current frame for which image content was lost as indicated in the generated mask.

12. The device of claim 11, wherein to generate the mask, the processing circuitry is configured to:
  warp a previous mask based on the pose information of the device when the device requested image content information of the previous frame and the pose information of the device when the device requested image content information of the current frame to generate a warped mask, wherein the previous mask indicates one or more slices of one or more previous frames for which image content information was lost; and
  generate the mask for the current frame based on the determined one or more slices of the current frame for which image content information was lost and the warped previous mask.

13. The device of claim 11, wherein to blend image content from the warped image content, the processing circuitry is configured to blend color values of pixels from the current frame and color values of pixels from the warped image content based on the generated mask.

14. The device of claim 10, wherein the processing circuitry is configured to determine a manner in which to warp the image content of the previous frame based on information received in a bitstream, and wherein to warp the image content of the previous frame, the processing circuitry is configured to warp the image content of the previous frame based on the determined manner.

15. The device of claim 10, wherein the processing circuitry is configured to receive a bitstream including image content information for a first portion of the current frame and not for a second portion of the current frame based on a determination by a server, that transmits the bitstream, of error concealment capabilities of the device receiving the bitstream.

16. The device of claim 10, wherein the processing circuitry is configured to:
  warp the image content of the error concealed frame based on current pose information of the device to generate a final frame,
  wherein to display image content, the display screen is configured to display image content based on the final frame.

17. The device of claim 10, wherein to warp, the processing circuitry is configured to one of apply asynchronous time warp (ATW), apply ATW with depth, apply asynchronous space warp (ASW), or apply ASW with depth.

18. The device of claim 10, wherein the processing circuitry is configured to:
  determine a quality of error concealment in the error concealed frame; and
  transmit information indicating that the current frame or the error concealed frame should not be a predictive frame, or one or more slices of the current frame or one or more slices of the error concealed frame should not be predictive one or more slices based on the determined quality of error concealment.

19. A device for image processing, the device comprising:
  means for determining, based on a received bitstream, one or more slices of a current frame for which image content information was lost;
  means for receiving image content of a different field of view (FOV) than a FOV of a previous frame;
  means for warping image content of the different FOV and the previous frame based on pose information of a device when the device requested image content information of the previous frame and pose information of the device when the device requested image content information of the current frame to generate warped image content;
  means for blending image content from the warped image content with image content of the current frame based on the determined one or more slices of the current frame for which image content information was lost to generate an error concealed frame; and
  means for displaying image content based on the error concealed frame.

20. The device of claim 19, further comprising:
  means for generating a mask for the current frame based on the determined one or more slices of the current frame for which image content information was lost, the mask indicating one or more slices of the current frame for which image content information was received in the bitstream, and the one or more slices of the current frame for which image content information was lost,
  wherein the means for blending the image content comprises:
    means for outputting image content from the current frame for one or more slices of the current frame for which image content was received in the bitstream as indicated in the generated mask; and
    means for blending image content from the warped image content for one or more slices of the current frame for which image content was lost as indicated in the generated mask.

21. The device of claim 20, wherein the means for generating the mask comprises:
  means for warping a previous mask based on the pose information of the device when the device requested image content information of the previous frame and the pose information of the device when the device requested image content information of the current frame to generate a warped mask, wherein the previous mask indicates one or more slices of one or more previous frames for which image content information was lost; and
  means for generating the mask for the current frame based on the determined one or more slices of the current frame for which image content information was lost and the warped previous mask.

22. A non-transitory computer-readable storage medium storing instructions thereon that when executed cause one or more processors to:
  determine, based on a received bitstream, one or more slices of a current frame for which image content information was lost;
  receive image content of a different field of view (FOV) than a FOV of a previous frame;
  warp image content of the different FOV and the previous frame based on pose information of a device when the device requested image content information of the previous frame and pose information of the device when the device requested image content information of the current frame to generate warped image content;
  blend image content from the warped image content with image content of the current frame to generate an error concealed frame by copying image content from the warped image content into the determined one or more slices of the current frame for which image content information was lost; and
  display image content based on the error concealed frame.

23. The non-transitory computer-readable storage medium of claim 22, further comprising instructions that cause the one or more processors to:
generate a mask for the current frame based on the determined one or more slices of the current frame for which image content information was lost, the mask indicating one or more slices of the current frame for which image content information was received in the bitstream, and the one or more slices of the current frame for which image content information was lost,
wherein the instructions that cause the one or more processors to blend the image content comprise instructions that cause the one or more processors to:
output image content from the current frame for one or more slices of the current frame for which image content was received in the bitstream as indicated in the generated mask; and
blend image content from the warped image content for one or more slices of the current frame for which image content was lost as indicated in the generated mask.

24. The non-transitory computer-readable storage medium of claim 23, wherein the instructions that cause the one or more processors to generate the mask comprise instructions that cause the one or more processors to:
warp a previous mask based on the pose information of the device when the device requested image content information of the previous frame and the pose information of the device when the device requested image content information of the current frame to generate a warped mask, wherein the previous mask indicates one or more slices of one or more previous frames for which image content information was lost; and
generate the mask for the current frame based on the determined one or more slices of the current frame for which image content information was lost and the warped previous mask.

* * * * *